(12) United States Patent
Pham et al.

(10) Patent No.: US 11,083,143 B2
(45) Date of Patent: Aug. 10, 2021

(54) METHOD AND SYSTEM FOR SIMULATING PLANT-GROWING ENVIRONMENT

(71) Applicant: TREANT PROTECTOR VIETNAM COMPANY LIMITED, Ho Chi Minh (VN)

(72) Inventors: Tuan Anh Pham, Ho Chi Minh (VN); Phu Ngoc Truong, Binh Dinh (VN); Ngoc Bao Dao, Lam Dong (VN)

(73) Assignee: TREANT PROTECTOR VIETNAM COMPANY LIMITED, Ho Chi Minh (VN)

( * ) Notice: Subject to any disclaimer, the term of this patent is extended or adjusted under 35 U.S.C. 154(b) by 0 days.

(21) Appl. No.: 16/198,900

(22) Filed: Nov. 23, 2018

(65) Prior Publication Data

US 2019/0183062 A1    Jun. 20, 2019

Related U.S. Application Data

(63) Continuation-in-part of application No. 16/139,097, filed on Sep. 23, 2018, now Pat. No. 10,709,076.
(Continued)

(51) Int. Cl.
*A01G 9/02* (2018.01)
*A01G 31/02* (2006.01)
(Continued)

(52) U.S. Cl.
CPC .......... *A01G 9/022* (2013.01); *A01G 9/0297* (2018.02); *A01G 9/246* (2013.01); *A01G 9/247* (2013.01);
(Continued)

(58) Field of Classification Search
CPC ...... A01G 9/022; A01G 9/0297; A01G 31/02; A01G 9/023; A01G 9/14; A01G 9/18;
(Continued)

(56) References Cited

U.S. PATENT DOCUMENTS 7,472,513 B2 * 1/2009 Bula .................... A01G 9/1423
47/89
8,910,419 B1 * 12/2014 Oberst .................. A01G 31/06
47/60

(Continued)

*Primary Examiner* — Trinh T Nguyen

(57) ABSTRACT

A method and an environment simulating system are disclosed which includes a database comprising a library of climate recipes characterizing growing environments for different plants and trees; a micro-controller electrically coupled to receive specific climate recipes when orders for different plants and trees are received from customers; an environment actuating system, electrically coupled to the micro-controller, operable to receive the specific climate recipes from the database; a sub-controller electrically coupled to receive the specific climate recipes from the micro-controller to drive the environment actuating system to generate specific growing environments in a growing enclosure in accordance with the specific orders; an array of web-based sensors, coupled to the growing enclosure and the micro-controller, operable to sense growing conditions of the specific growing environments and to feedback the growing conditions to the micro-controller; and a network server adapted to couple the Database, the micro-controller, the sub-controller, the array of web-based sensors, the growing enclosure, and the customers to a network.

15 Claims, 15 Drawing Sheets

Related U.S. Application Data

(60) Provisional application No. 62/608,358, filed on Dec. 20, 2017.

(51) Int. Cl.
| | | |
|---|---|---|
| *A01G 9/029* | (2018.01) | |
| *A01G 9/24* | (2006.01) | |
| *A01G 31/06* | (2006.01) | |
| *A01G 9/00* | (2018.01) | |
| *A01G 27/00* | (2006.01) | |

(52) U.S. Cl.
CPC .............. *A01G 9/249* (2019.05); *A01G 31/02* (2013.01); *A01G 31/06* (2013.01); *A01G 27/00* (2013.01); *A01G 2009/003* (2013.01)

(58) Field of Classification Search
CPC . A01G 9/20; A01G 9/24; A01G 9/246; A01G 9/247; A01G 9/26; A01G 9/249; A01G 9/241; A01G 27/001; A01G 27/003; A01G 27/005; A01G 27/006; A01G 27/008; A01G 27/02; A01G 27/06; A01G 7/045; A01G 2031/006; A01G 31/06
See application file for complete search history.

(56) References Cited

U.S. PATENT DOCUMENTS

| | | | |
|---|---|---|---|
| 2014/0020292 A1* | 1/2014 | McNamara | A01G 9/24 47/66.6 |
| 2014/0115958 A1* | 5/2014 | Helene | A01G 31/06 47/17 |
| 2016/0066516 A1* | 3/2016 | Palmieri, Jr. | A01G 9/24 47/17 |
| 2016/0212954 A1* | 7/2016 | Argento | A01G 31/02 |
| 2017/0035008 A1* | 2/2017 | Ellins | A01G 9/249 |
| 2017/0099790 A1* | 4/2017 | Gonyer | A01G 31/02 |
| 2017/0347547 A1* | 12/2017 | Lu | G08B 21/18 |
| 2018/0184602 A1* | 7/2018 | Ofir | A01G 31/02 |
| 2019/0075741 A1* | 3/2019 | Olesen | A01G 27/003 |
| 2020/0352112 A1* | 11/2020 | Hunter | A01G 9/028 |
| 2020/0404862 A1* | 12/2020 | Bowles | F25B 21/04 |

\* cited by examiner

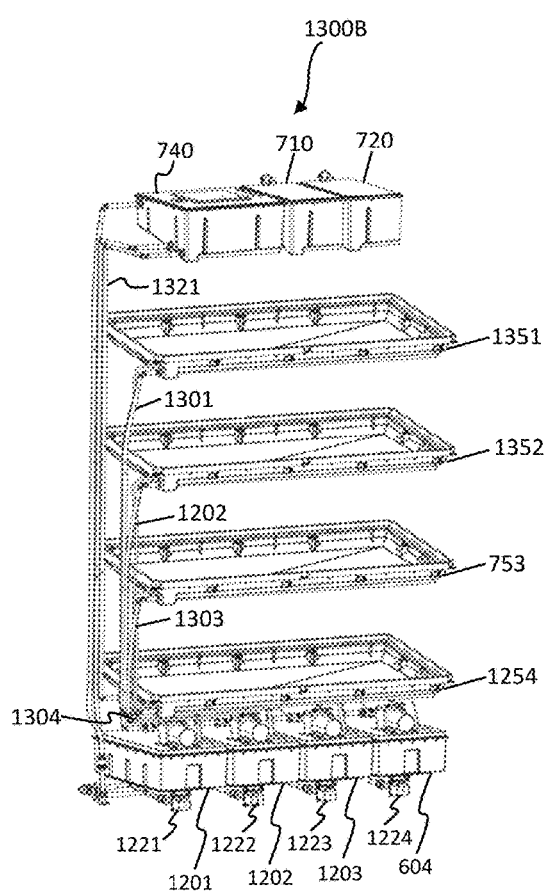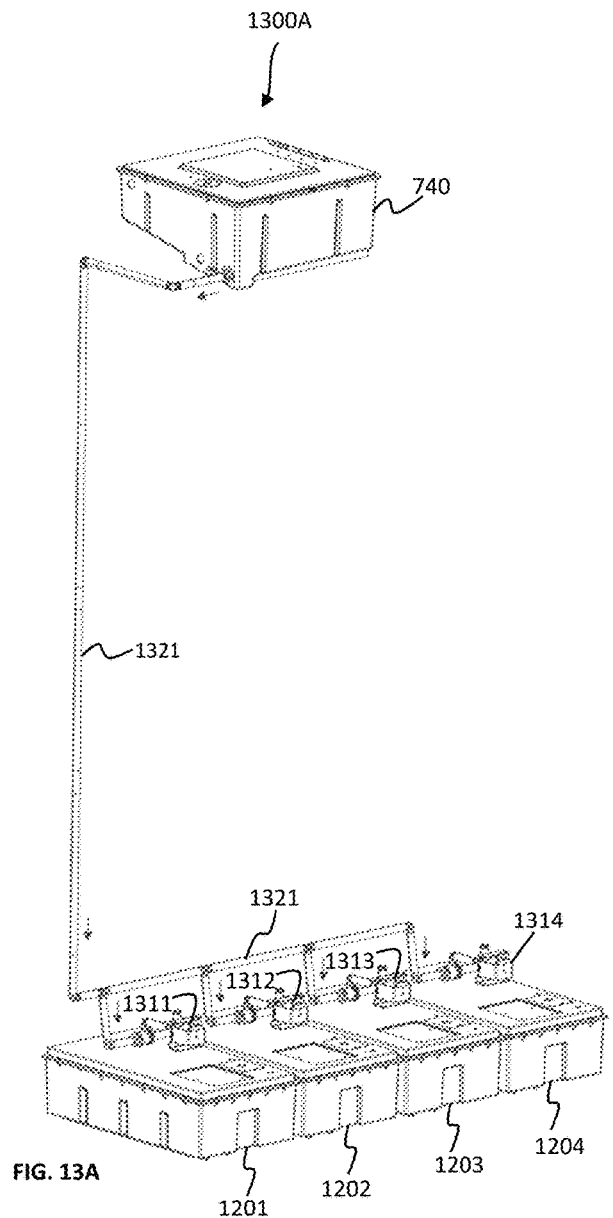
FIG. 13B
FIG. 13A

METHOD AND SYSTEM FOR SIMULATING PLANT-GROWING ENVIRONMENT

CROSS REFERENCE TO RELATED APPLICATION

This continuation-in-part (CIP) patent application claims priority filing benefit of U.S. non-provisional patent application, entitled "Smart Cabinet for Home Gardening", Ser. No. 16/139,097 filed in Sep. 21, 2018, which claims priority benefit of the Provisional Patent No. 62/608,358 filed in December, 2017, which are hereby incorporated by reference in its entirety.

FIELD OF THE INVENTION

The present invention relates generally to the field of environment simulation. More specifically, the present invention relates to a web-based environment simulating system for plant growing.

BACKGROUND ART

The increases in population and the reduction in arable lands due to climate change and urbanization trends have prompted us to think of different ways to produce more foods. Due to climate change—such as draught caused by El Nino—lands have become dry, less and less fertile, and thus unsuitable for agriculture. In addition, draught also causes saline water invasion that further reduces agricultural lands. Worldwide, around three million hectares of agricultural land are lost each year because the soil degrades and becomes unusable due to different kinds of erosions, which is when soil components are depleted by wind, water, or salt water intrusion. An additional four million hectares are lost each year when agricultural land is converted and used for highways, housing, factories, and other urban needs. In the United States, around 140 million hectares of agricultural land have been lost in the last 30 years as a result of soil degradation and conversion for urban use. In the coastal areas in Vietnam, saltwater intrusion has extended up to 20 to 30 km further inland than average—up to 90 km inland in some areas. While an annual event, this level of saltwater intrusion, which is the result of poor rainfall, has reduced the flow in the Mekong River. Groundwater depletion was the most extensive ever recorded. The saltwater intrusion left river water too salty for use for either human or animal consumption or to irrigate crops. A total of 659,245 hectares of cropland, including more than 273,000 hectares of rice—the staple crop—have been damaged to varying degrees. Of the total damaged rice crop in the 18 most affected provinces, 161,030 hectares or 53.2% have suffered losses of 70 percent of production or more, classified by the Government as 'extreme loss'. Significant impacts on other cash and perennial crop yields have also been reported.

To cope with the above problems, farmers in developing countries like Vietnam have used synthetic fertilizers extensively in all-year-round cultivation cycles to increase productivities in the remaining croplands. However, extensive use of synthetic fertilizers have degraded the soils. Over time, the continued harvest and replanting of crops have removed the nutrients required for healthy soil and plant growth. Nutrients would normally replenish themselves over time naturally, but are unable to because of the persistent planting of crops, a practice which breaks the natural nutrient cycle, and ultimately strips the soil of the valuable nutrients it needs. And while traditional synthetic fertilizers are designed to put in the key macro nutrients needed for plant growth—such as Nitrogen ($N_2$), Phosphorus (P), and Potassium (K)—they do not restore any other nutrients that were taken out, nor do they restore the organic matters necessary for a thriving soil environment. Thus, the depletion of soil nutrients and soil microorganisms contributes to soil erosion and the loss of arable topsoil. The Earth is losing arable topsoil at a rate of 75 to 100 Giga tons per year. If soil loss continues at present rates, it is estimated that there is only another 48 years of topsoil left.

Various approaches have been designed to combat the above problems: Weather models, LIDAR data acquisition, Environmental Research Institute (ERI), and various environmental simulations have been formulated to study the effects of the climate change on world agriculture and food productions. The ponics systems—including aeroponics, aquaponics, and hydroponics—are also employed in an enclosed environment like a greenhouse so that the temperature and humidity can be accurately regulated. The aims of the ponics systems are to provide healthy foods and vegetables without using the ever reducing and depleting traditional agricultural lands.

The weather modeling, LIDAR data acquisition, Environmental Research Institute (ERI), and environmental simulations have provided researchers and farmers with great knowledge regarding the effects of climate changes, earth weather systems, real-time mappings of the agricultural lands. However, these studies are complex, expensive, and limited at mathematical models for researchers to study. They have not yet provided any real-world solutions to the common people. For example, in the "Simulation of Control System in the Environment of Mushroom Growing Room Using Fuzzy Logic" study by Sina Faizollafadez Ardabili et al., the influence parameters such as temperature, relative, $CO_2$ concentration in mushrooms growing rooms are modeled using fuzzy logic controller. Fuzzy logic controller was designed by obtained data from optimal condition on growing hall using precise sensors and loggers during specific periods of time. Parts of system such as growing hall and actuators were modeled on Simulink part of Matlab® software and the designed fuzzy controller were applied on modeled system and output of the modeled system compared with the real system output using comparing parameters such as Mean Absolute Error (MAE), Root Mean Square Error (RMSE), Mean Absolute Percentage/Relative error (MAPE) and Pearson Correlation (R). Obtained results from both system showed that the mean values of modeled system for temperature and relative humidity are closer to set point than real system and also correlation between real and model system for three parameters indicates that the model and real system are working close. However, this study only serves as a technical papers providing academic insights into the mushroom growing environments. It does not provide a real-world solutions for the majority of the people who want to obtain high-quality foods on their diner tables. In addition, this fuzzy logic controller only simulates the growing environment for one particular types of plant, i.e., mushrooms. It cannot provide different growing environments for different types of crops that people need.

In an aeroponics system, the roots of the plants are misted with nutrients, water, and oxygen. Using a closed loop system, 95% less water than field farming is used and 40% less than hydroponics. LED lights are used to create a precise light formula for each plant, giving the plants the exact range, intensity, and frequency that the plants require for photosynthesis in the most energy-efficient way. With aeroponics, a grower can take the exact same seed from the field and grow it in half the time as a traditional field farmer, leading to 390 times more productivity per square foot than a commercial field farm. Using aeroponic technology, researchers discovered the yields of plants grown were more than 30% larger on average. For example, red kale had a 65% increase, bell peppers had a 53% increase, cucumbers were 7% larger, and squash 50%. Both aeroponic and soil growing methods produced comparable nutritional value. With traditional growing methods in soil, a lot of space is required. The problem is that we have less and less of it, and we are losing about 3,000 acres of farmland to development every day. But growing aeroponics vertically requires only 10% of the room traditional farming needs.

The problems with the current ponics agricultural systems are two folds: First, they can only grow nutritious and healthy common plants and trees such as lettuces, tomatoes, basils, etc. They cannot mimic the particular tastes and aromas of a large varieties plants and trees that grow in a certain geographical areas. For example, the people in Vietnam love to have juicy and delicious grapes, apples, and strawberries from the U.S. The people in South Vietnam cannot grow and enjoy the famous Hung Yen longan fruits (*Dimocarpus longan*) only found in North Vietnam. In order to meet these demands, the exact environment, weather, and influence as the local geographical areas must be actually repeated. In other words, the current ponics systems are limited to common plants and trees and they cannot dynamically provide the growing environments for indigenous plants and trees. Second, the current ponics systems are still inefficient and in needs of improvements as described in the patent application, entitled "Smart Cabinet for Home Gardening", Ser. No. 16/139,097 filed in Sep. 21, 2018 by Tuan Pham, which are hereby incorporated by reference in its entirety.

Therefore what is needed is an environment simulating method and system that can provide real-world solutions for the loss of croplands and food shortages.

What is needed is an environment simulating method and system that are not limited to the academic researches and studies.

This means that, what is needed is an environment simulating method and system that can precisely mimic different growing conditions for different types of plants and trees.

Yet, what is needed is an environment simulating method and system that can simulate the exact growing environments for indigenous and exotic plants such as the caterpillar fungus (*Orphiocordyceps sinensis*).

Yet, what is needed is an environment simulating method and system that are efficient, affordable, useful, and readily available to the common people in the real-world.

The present invention provides solutions to the above needs.

SUMMARY OF THE INVENTION

Accordingly, an object of the present invention is to provide a method and an environment-simulating system which includes a Database comprising a library of climate recipes characterizing growing environments for different plants; a micro-controller electrically coupled to receive climate recipes when orders for the different plants and trees are received from customers; an environment actuating system, electrically coupled to the micro-controller, operable to receive the climate recipes from the Database; a sub-controller electrically coupled to receive the climate recipes from the micro-controller to drive the environment actuating system to generate the growing environments in a growing enclosure in accordance with the such orders; an array of web-based sensors, coupled to the growing enclosure and the micro-controller, operable to sense growing conditions of the growing environments and to feedback the growing conditions to the micro-controller; and a network server adapted to couple the Database, the micro-controller, the sub-controller, the array of web-based sensors, the growing enclosure, and the customers to a network.

Another object of the present invention is to provide a method for simulating a plant growing environment which includes receiving an order for different plants, determining whether the order exists in the Database, loading a climate recipe corresponding to the climate recipe to a micro-controller if such order is found in the Database, determining growing conditions and influence parameters using the micro-controller, loading the growing conditions and influence parameters to a sub-controller in form of commands which drive an environment actuating system that mimics the exact growing conditions for the plants, sensing the real-time growing conditions and sending the sensed information back to the micro-controller, and if the climate recipe is not found in the Database, creating such climate recipe and storing it in the Database.

Another object of the present invention is to provide an environment simulating system that can provide real-world solutions to the food problems and the loss of croplands, which is not another academic mathematical model.

Another object of the present invention is to provide an environment simulating system that contains climate recipes and growing conditions in a Database that helps growing any exotic and indigenous plants and fruits only found in particular geographical areas.

Another object of the present invention is to provide an environment simulating system that can help stopping the on-going abusive cultivation methods of agricultural lands.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 13A is a schematic diagram of the water return system—a part of the water circulation system—in accordance with an embodiment of the present invention;

FIG. 13B is a schematic diagram of the complete water circulation system that provides water nutrient solution mixture to and receives excess water from each plant growing area in accordance with an embodiment of the present invention;

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
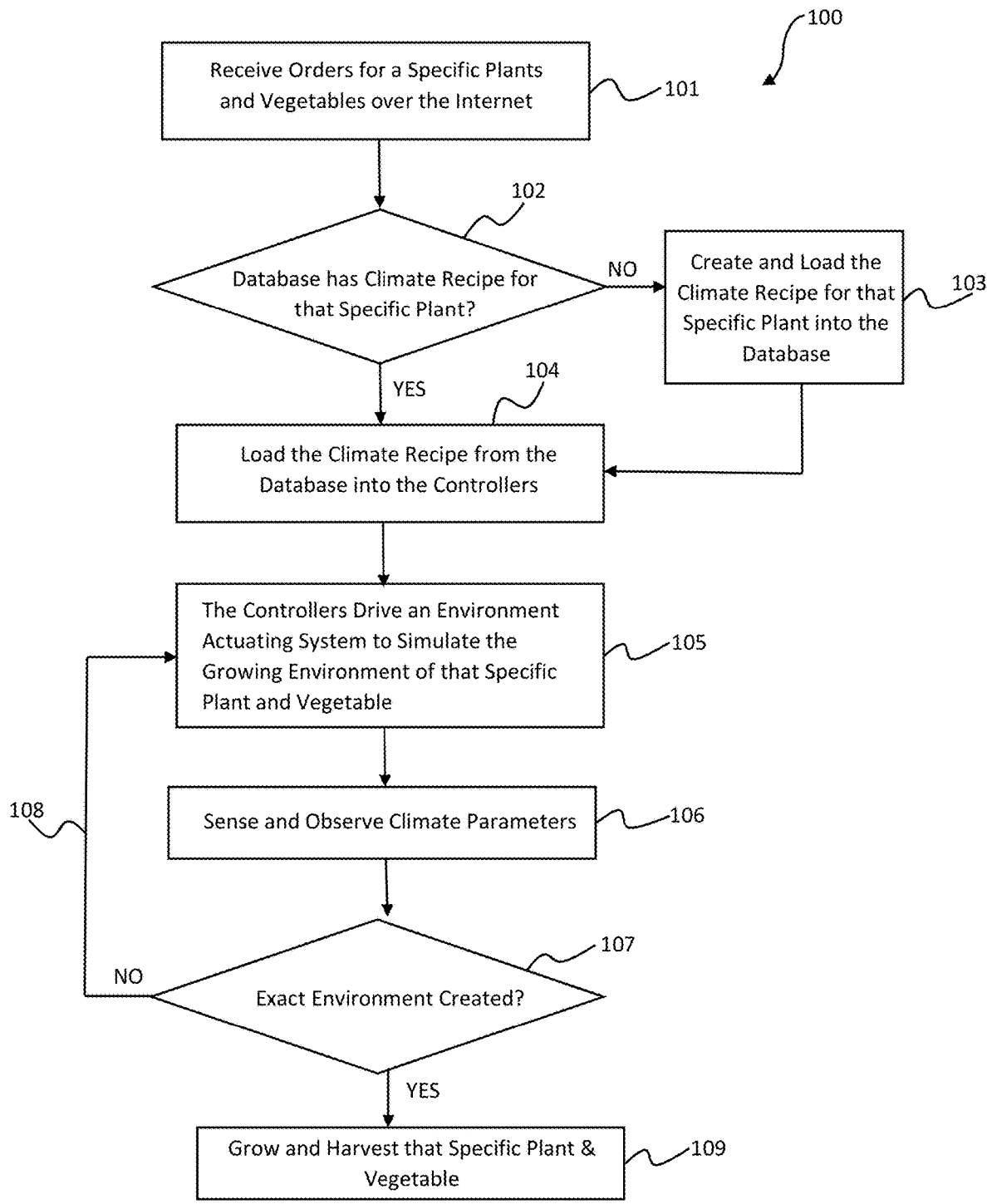
FIG. 1 is a flow chart for a method of simulating a plant and vegetable growing environment in accordance with an embodiment of the present invention.

Referring now to FIG. 1, a flow chart of a method 100 for simulating plants and trees growing environments in accordance with an embodiment of the present invention is illustrated.

At step 101, customer orders for different types of plants and trees are received over a network. In an exemplary embodiment of the present invention, step 101 is implemented by smart cabinets for home gardening that are connected to the network so that customers from around the world who bought the smart cabinet can send in their orders using an Application Programming Interface (API). The smart cabinet for home gardening is described by a patent application, entitled "Smart Cabinet for Home Gardening", Ser. No. 16/139,097 filed in Sep. 21, 2018, which are hereby incorporated by reference in its entirety.

At step 102, customer orders are determined if the corresponding climate recipes are already existed in the Database. Each orders of different plants and trees have corresponding climate recipes which include growing conditions, weather, and influences. These parameters are encoded, converted into computer-executable commands, and stored in a proprietary Database. In various embodiments of the present invention, the environment simulating systems are connected to the Database via a cloud network. Each environment simulating system has its own controllers and growing areas similar to the smart cabinet 100 described in the parent patent application. When a customer enters an order on touchscreen 131, the order is checked if the corresponding climate recipes are already existed in the Database which can be a cloud Database via the network. As such, the Database is implemented in a MongoDb which is a type of web-based noSQL (non-Structured Query Language) that enables both reading and writing of numerous requests at the same time without a predefined schema. The Database includes a Message QueuingTelemetry Transport (MQTT) broker that can receive manage myriads of real-time sensing data from sensors. In addition, noSQL Database is an open-source database that can add servers and brokers horizontally as the Database grows bigger. This means that within the scope of the present invention, many environment simulating system such as smart cabinet 100 can be added to the Database.

At step 103, the commands for the climate recipes and growing conditions are loaded into at least two controllers which control and manage the operations of the environment simulating system. The at least two controllers are located within the environment simulating system. In one particular embodiment of the present invention, the at least two controllers are located in controller box 230 of the smart cabinet 100.

At step 104, the commands from the Database are loaded into the at least two controllers. In the at least two controllers, the commands are analyzed into pressure, temperatures, $CO_2$ level, pH/TDS level, humidity, light wavelengths (see FIG. 15), and intensities parameters necessary to simulate the growing environment for the plants and trees.

At step 105, the at least two controllers are enabled to drive an environment actuating system. In one exemplary implementation of step 104, at least two controllers include a micro-controller and a sub-controller. The micro-controller is adapted to receive commands from the Database and communicate to the customers via a world wide web (www) regarding their orders, to receive sensing data from the environment actuating system, and to display the growing phases of the plants and trees by means of Short Message System (SMS) and video images. The sub-controller is adapted to drive the environment actuating system to recreate the exact growing conditions and influences specific to the ordered plants and trees.

At step 106, the climate recipes including growing conditions and parameters are sensed by sensors. Real-time sensing data are sent back to the micro-controller to be compared with the collected data stored in the Database so that exact growing conditions and environments are guaranteed. In many embodiments of the present invention, sensors include pressure, temperatures, $CO_2$ level, pH/TDS level, humidity, light wavelengths (see FIG. 15), and intensities sensors. In various embodiments of the present invention, the collected data are obtained from researches and studies of the plants and trees at their natural habitats. The collected data and studies are converted into computer-executable commands with identification codes. The collections of computer-executable commands aimed to repeat the growing conditions for different plants and trees are called climate recipes and they are stored in addressed memory locations in the Database.

Then at step 107, if the exact growing conditions and environments are achieved then method 100 continues until finished when the ordered plants and trees are harvested.

At step 108, if the exact growing conditions and environments are not achieved or when the errors between the collected data and the sensed data surpassed the set thresholds, the micro-controller orders the sub-controller to adjust the driving and the parameters of the environment simulating actuators.

At step 109, if the growing conditions and parameters are achieved then the Database are updated with the correct growing conditions and environments so that they can be repeated for other customers in the future. In various embodiments of the present invention, method 100 can be a computer-implemented software program stored in non-transitory cache memories in Redis format of the Database.

Figure 2:
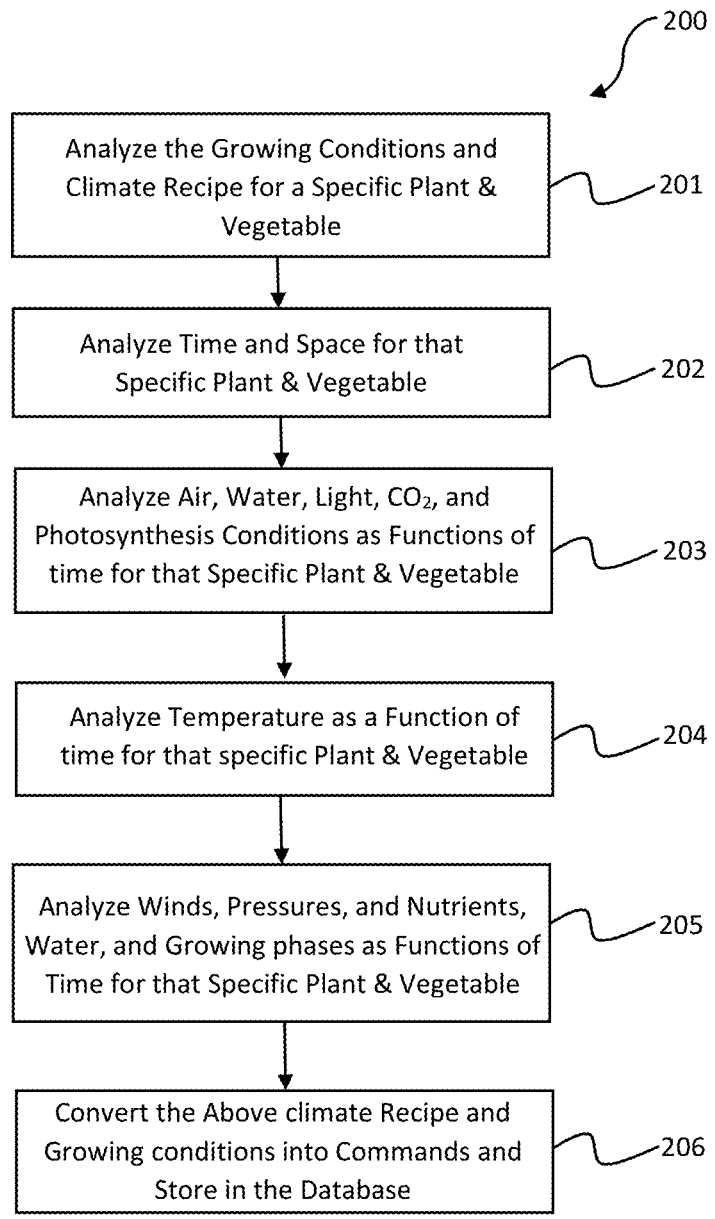
FIG. 2 is a flow chart of a method for determining climate recipes for growing different plants and trees in accordance with an embodiment of the present invention.

Now referring to FIG. 2, a method 200 for determining climate recipes for growing different plants and trees is shown. Method 200 can be considered as a sub-routine of step 103 above.

At step 201, after orders from a customer are received, climate recipes and growing conditions for different plants and trees are analyzed to that the exact results from their natural or indigenous habitats can be repeated.

At step 202, time and space of the different plants and trees are carefully studied, analyzed, and recorded. In other words, the growing phases and conditions are noted. As such, temperatures, pressures, $CO_2$ levels, pH levels, light wavelengths and intensities as well as humidity, and nutrients all are functions of time. In many implementations of the present invention, pressures are functions of time, temperatures, mist spraying module, air flow, a vacuum module, a water sprinkler system, air conditioning module, and the degree of airtight of the growing enclosures. Humidity depends on time, mist spraying module, and air flow.

At step 203, air, water, light wavelengths and intensities, $CO_2$ levels, and photosynthesis conditions as functions of time are studied and recorded for different plants and trees.

At step 204, temperatures are a function of time for different plants and trees are analyzed. In various implementations of step 204, temperatures are set by vacuum module, mist spraying module, LED lights, water sprinkler system, air flow, and air conditioning module, all have time schedules in accordance with the real habitats.

At step 205, wind speeds, humidity, water levels, nutrient levels as functions of time and growing phases are analyzed.

In various embodiments of the present invention, plant and vegetable physiologies and biological behaviors in their natural habitats are also analyzed.

Finally, at step 206, all of the parameters as functions of time are converted into computer-implemented commands such as Linux, MongoDB, Redis, etc. so that micro-controller and sub-controller can be programmed to recognized and executed.

Computer program code for carrying out operations for aspects of the present invention may be written in any combination of one or more programming languages, including an object oriented programming language such as Oracle, DB2, Microsoft SQL server, MySQL, noSQL, MongoDB, BigTable, Redis, Reven DB, Cassandra, Hbase, Neo4J, Python, Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
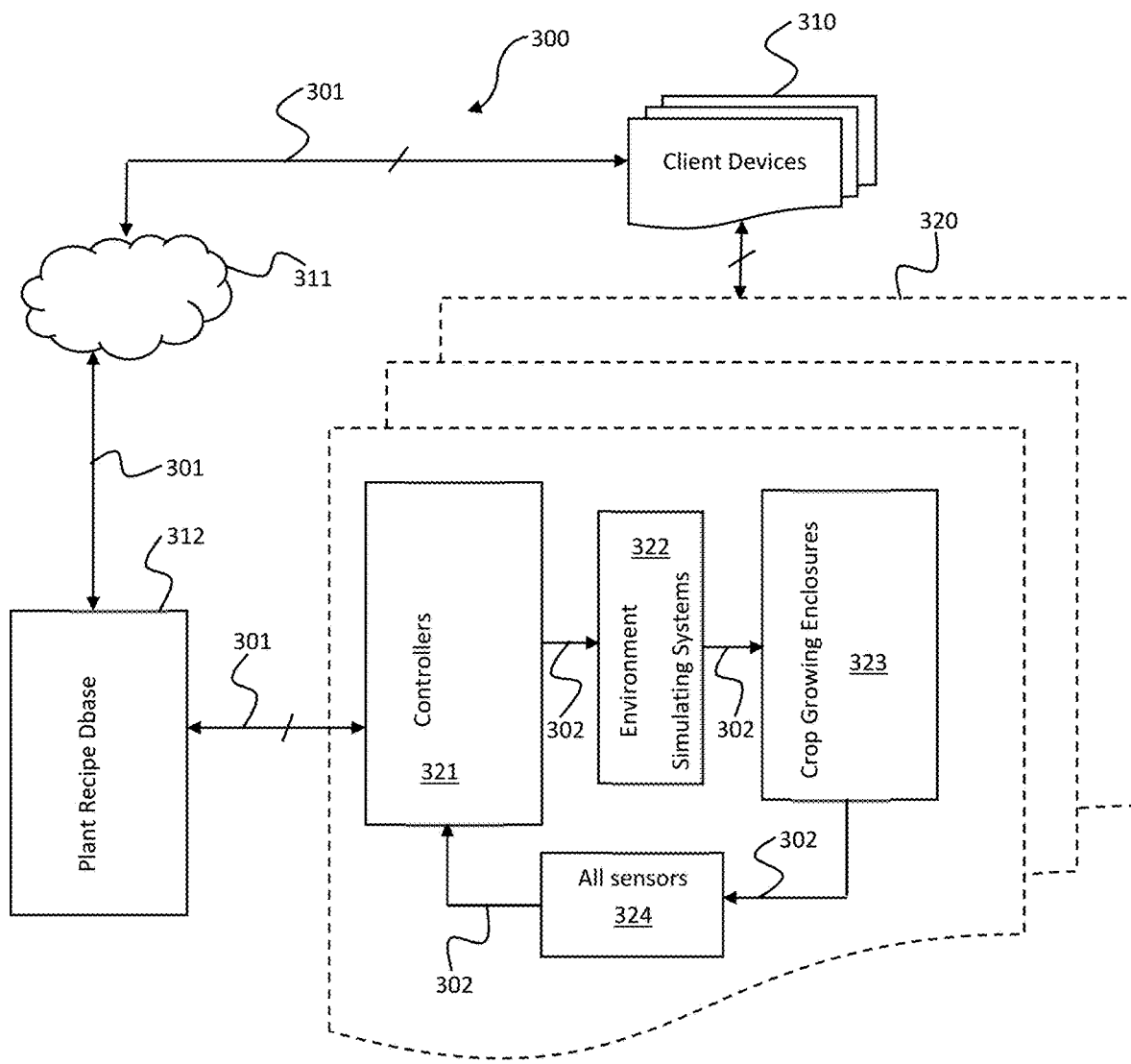
FIG. 3 is a schematic diagram of an environment simulating system for growing different plants and trees in accordance with an embodiment of the present invention.

Referring next to FIG. 3, a schematic diagram of an environment simulating system 300 in accordance with an exemplary embodiment of the present invention is illustrated. At a first blush, environment simulating system 300 of the present invention is a web-based system wherein all components as well as customers' mobile devices are connected to a network such as a cloud Wide Area Network (WAN). In some aspects of the present invention, customers can order the different plants and trees by logging into a web-page or via software applications such as User Interface (UI) installed onto their computers or mobile devices. In other aspects of the present invention, customers can enter their orders by a touchscreen display of the environment simulating devices such as smart cabinet 100. In addition, customers can receive the growing phases, advises, change climate recipes by text messages (SMS) or real-time video images, and/or UI via the network.

Environment simulating system 300 includes customers' computer devices 310 which include, but not limited to, personal digital assistance (PDA), mobile phones, laptops, and/or desktop computers. Customers' computer devices 310 are connected to a network 311, a Database 312 which contains all climate recipes, and a plurality of environment simulating apparatus 320. Each environment simulating apparatus 320 includes at least two controllers 321, an environment actuating system 322, a growing enclosure 323, and all sensors 324.

Continuing with FIG. 3, customers' computer devices 310, Database 312, and a plurality of environment simulating apparatus 320 are connected to network 311 by wireless communication channels 301. In many aspects of the present invention, wireless communication channel 301 may include, but not limited to, short range wireless communication channels, mid-range wireless communication channels, and long range wireless communication channels. Wireless short range communication channels include ZigBee™/IEEE 802.15.4, Bluetooth™, Z-wave, NFC, Wi-Fi/802.11, cellular (e.g., GSM, GPRS, WCDMA, HSPA, and LTE, etc.), IEEE 802.15.4, IEEE 802.22, ISA100a, wireless USB, and Infrared (IR), LoRa devices, etc. Medium range wireless communication channels in this embodiment of communication [[communication]] channel 301 include Wi-Fi and Hotspot. Long range wireless communication channels include UHFNHF radio frequencies.

Within each environment simulating apparatus 320, at least two controllers 321, environment actuating system 322, growing enclosure 323, and all sensors 324 are connected together by a RS-485 bus which are wired communication channels that use differential signals in bi-directional data transmission over a long-distance with minimal signal losses. Wireless communication channels 301 and RS-485 buses 302 are well-known in the art and will not be discussed in details in the present invention.

Figure 4:
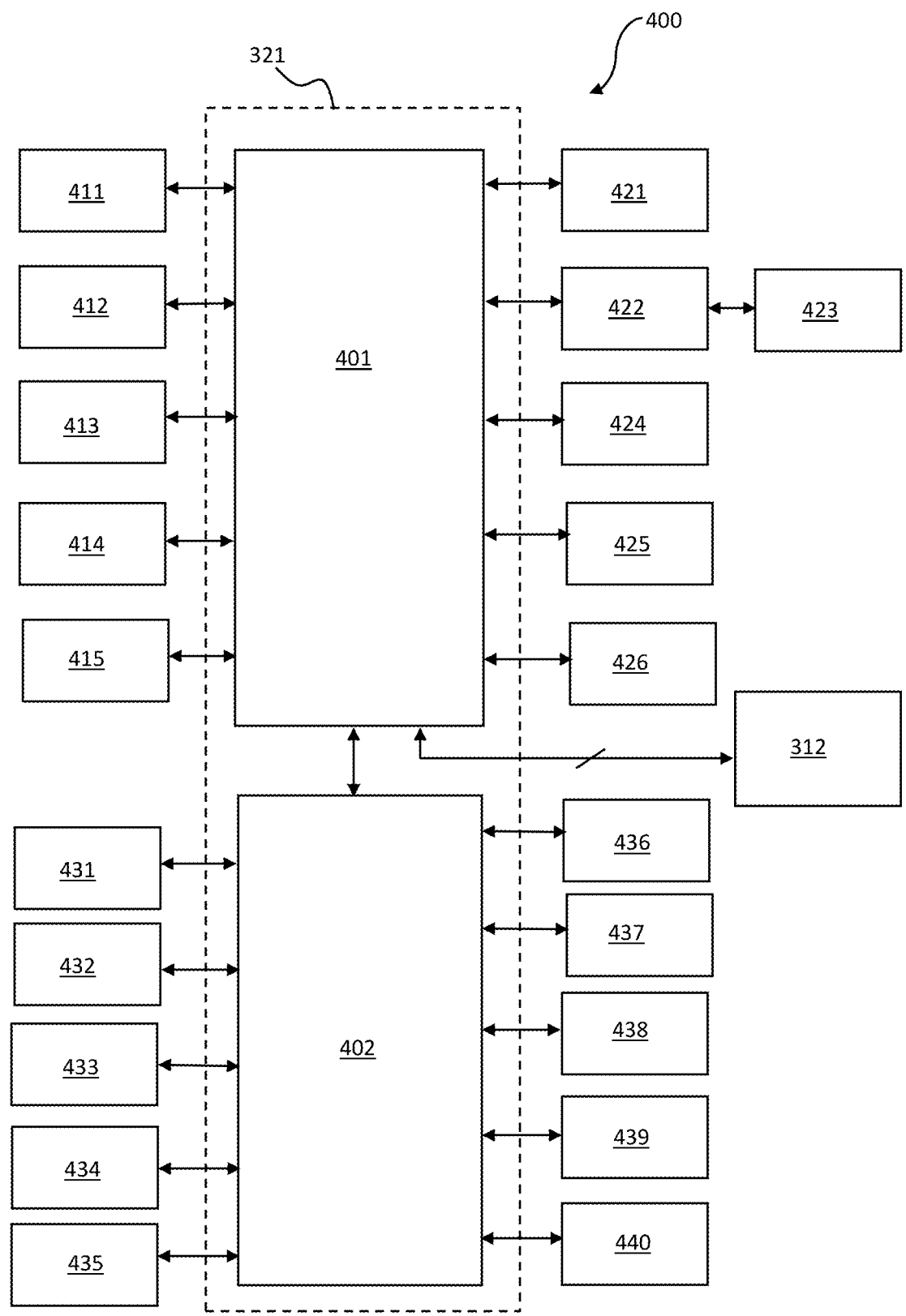
FIG. 4 is a schematic diagram of the micro-controller and sub-controller and the feedback of the environment simulating system in accordance with an embodiment of the present invention.

Next referring to FIG. 4, a schematic diagram of at least two controllers 400 in accordance with an exemplary embodiment of the present invention is illustrated. In many aspects of the present invention, at least two controllers 400 are located in each of a plurality of environment simulating apparatus 320. At least two controllers 400 include a micro-controller 401 and a sub-controller 402. The main functions of micro-controller 401 are: (1) to communicate with a network server via network 311, (2) to receive and analyze climate recipes from Database 312, (3) to receive feedback signals from sensors, and (4) to send climate recipe commands to sub-controllers 402. Upon receiving climate recipe commands, sub-controller 402 drives environment actuating system 322. More specifically, micro-controller 401 is electrically connected to a camera 421, an Ethernet card 422 which is connected to a Wi-Fi network 423, a RF transceiver 424, a Wi-Fi interface card 425, and a display screen 426. Camera 421 sends real-time images of the plants and trees in growing enclosure 315 to customers so that customers can observe and follow the growing phases of their plants and trees. Ethernet card 422, Wi-Fi network 423, RF transceiver 424, and Wi-Fi interface card 425 facilitate the communication between micro-controller 401 and customers' computer devices 310 via network 311. Display screen 426 is a touchscreen that enables manual controls of each environment simulating apparatus 320. Micro-controller 426 provides a graphic user interface (GUI) that displays the control menus on display screen 426. In an exemplary embodiment, display screen 426 is that same as to touchscreen 131 in the parent application by the same inventor.

Continuing with FIG. 4, micro-controller 401 is also connected to sensors 324 which include a Light Detection and Ranging (LiDAR) 411, a pH level sensor 412, a TDS sensor 413, water level sensor 414, and other sensors 415 such as humidity sensor, light intensity sensors, $CO_2$ level sensor, temperature and pressure sensors. pH level sensor 412 and TDS (total dissolved solid) sensor 413 are used to sense the nutrients being provided to plants and trees. Equipped with these information, micro-controller 401 commands sub-controller 402 to drive environment actuating system 322 to provide the correct nutrient contents for the plants and trees. Water level sensor 414 measures the amount of water in the mixing tank so that the precise pH and TDS levels can be achieved. The detailed process of providing the correct nutrient levels was described in the patent application entitled "Smart Cabinet for Home Gardening", Ser. No. 16/139,097 filed in Sep. 21, 2018 by Tuan Pham, which are hereby incorporated by reference in its entirety. Other sensors 415 measure temperature, pressure, $CO_2$ level, light intensity and wavelengths, all important influences that provide the correct growing conditions and mimic the correct climate for the plants and trees.

Still referring to FIG. 4, sub-controller 402 is connected to control air valves 431, water pumps 432, $CO_2$ module 433, LED driver 434, fans 435, mist spraying module 436, air conditioning module 437, vacuum module 438, water chilling module 439, and water sprinkler module 440. In various embodiments of the present invention, air valves 431 are solenoid valves designed to control the amount of air flowing through growing enclosure 315. Please refer to FIG. 10 and FIG. 11 for more details. $CO_2$ module 433 can be either a $CO_2$ enrichment (exhale) bag, or a $CO_2$ regulator.

Figure 5:
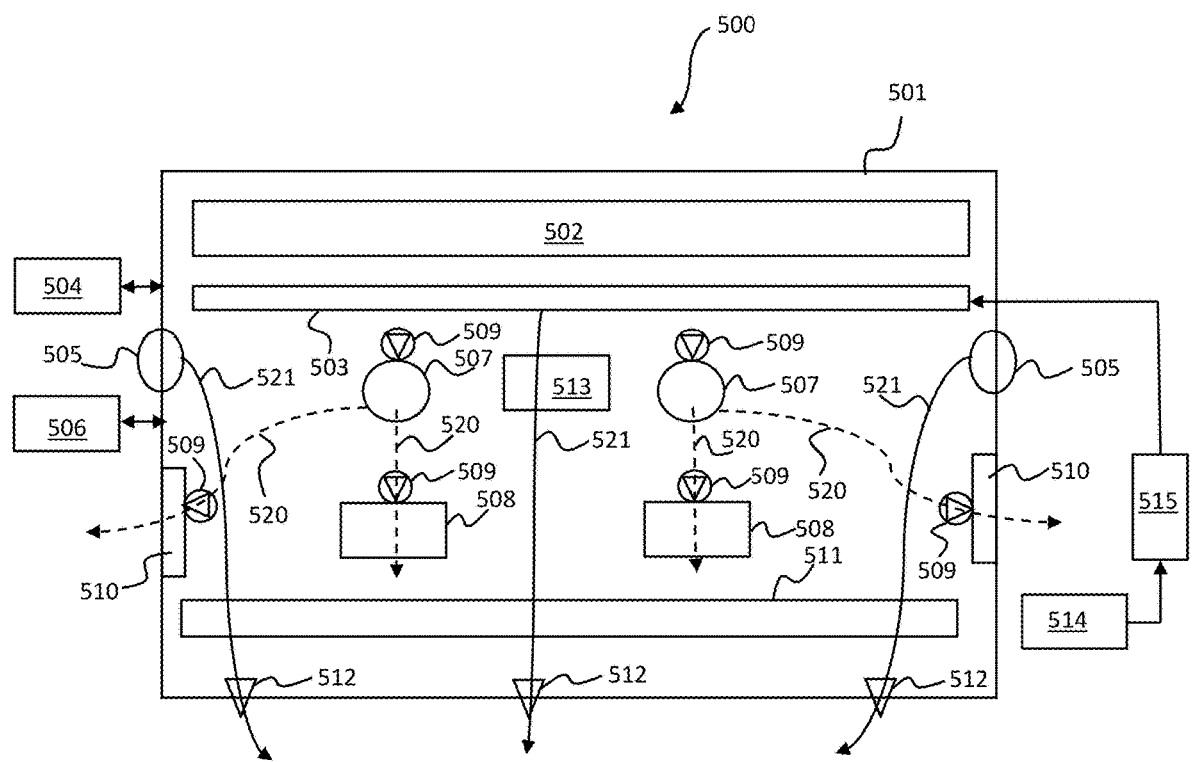
FIG. 5 is a perspective schematic diagram of a plant growing area designed to mimic the climate recipe which includes pressure, temperature, air flow, water flow, light wavelength and intensity, nutrients, and $CO_2$ level for a specific plant and vegetable in accordance with an exemplary embodiment of the present invention.

Now referring to FIG. 5, a perspective diagram of an environment simulating apparatus 500 in accordance to an exemplary embodiment of the present invention is illustrated. Environment simulating apparatus 500 includes a planting enclosure 501, an array of LED lights 502 located at the ceiling of planting enclosure 501, water sprinkler module 503, air conditioning module (HVAC) 504, a mist spraying module 505, a vacuum module 506, blowing fans 507, air exit windows 508, unidirectional air valves 509, air suction fans 510, plant growing tray 511, unidirectional water valves 512, a $CO_2$ regulator 513, an ultraviolet (UV) sterilizer module 514, and water tanks 515. UV sterilizer module 514 is designed to clear the water source of any microbes and bacteria harmful to plants and trees. It is noted that in FIG. 5, nutrient mixing tanks and all sensors are omitted to simplify the explanation of the environment simulation principles of the present invention. FIG. 6 to FIG. 14 describe a complete exemplary embodiment of environment simulating apparatus 500 which is the same as smart cabinet 100 for home gardening, which is disclosed in details in the parent application.

Figure 15:
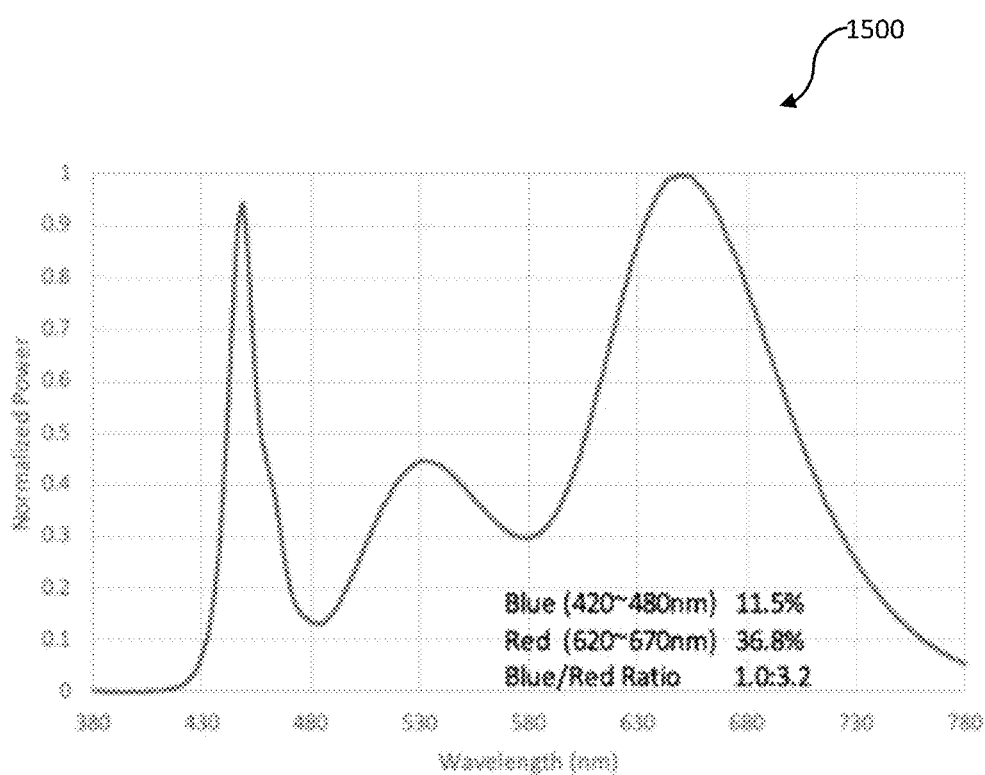
FIG. 15 illustrates a graph of the intensity versus frequency of the light emitting light diodes (LED) used as a light source in the environment simulating system in accordance to an exemplary embodiment of the present invention.

Referring to FIG. 15, a graph 1500 of intensity versus frequency of array of LED lights 502 are designed to mimic natural light and its influences on plants and trees. Maximum powers of array of LED lights 502 are concentrated on blue and red wavelengths because these wavelengths most favor the photosynthesis activity of plants and trees. In many aspects of the present invention, the spectrum of array of LED lights 502 is illustrated in graph 1500. The efficiency of red (650-665 nm) LEDs on plant growth is easy to understand because these wavelengths perfectly fit with the absorption peak of chlorophylls and phytochrome, while the supplemented blue light introduced the idea that growth under natural light could be mimicked using blue and red LEDs. In addition to providing a better excitation of the different types of photoreceptors, the blue and red combination allowed a higher photosynthetic activity than that under either monochromatic light.

In operation, a customer can send in a request for different plants and trees via network 311. Each specific plant and vegetable has a specific climate recipe that includes all growing parameters such as temperatures, pressure, light wavelengths and intensities, $CO_2$ level, nutrient levels, humidity, etc. Micro-controller 401 checks whether Database 312 has this climate recipe. If Database 312 has this particular climate recipe, micro-controller 401 loads the climate recipe commands to sub-controller 402. Then, sub-controller 402 drives each environment simulating apparatus 500 as follows.

First, the wavelength and intensity of array of LED lights 501 is set and changed according to a schedule programmed in the climate recipe commands. In some aspects of the present invention, the intensity of array of LED lights 501 follows graph 1500. Temperature is set by air conditioning module 504 and changes with time. Humidity is set by mist spraying module 505 and water sprinkler module 503. Pressure is set by a vacuum module 506, blowing fans 507, air exit windows 508 which are controlled by solenoid valves 509, and air suction fans 510. The direction of wind blow 520 and water flow 521 are shown. Finally, $CO_2$ level necessary for photosynthesis activity is set by $CO_2$ regulator 513.

Figure 6:
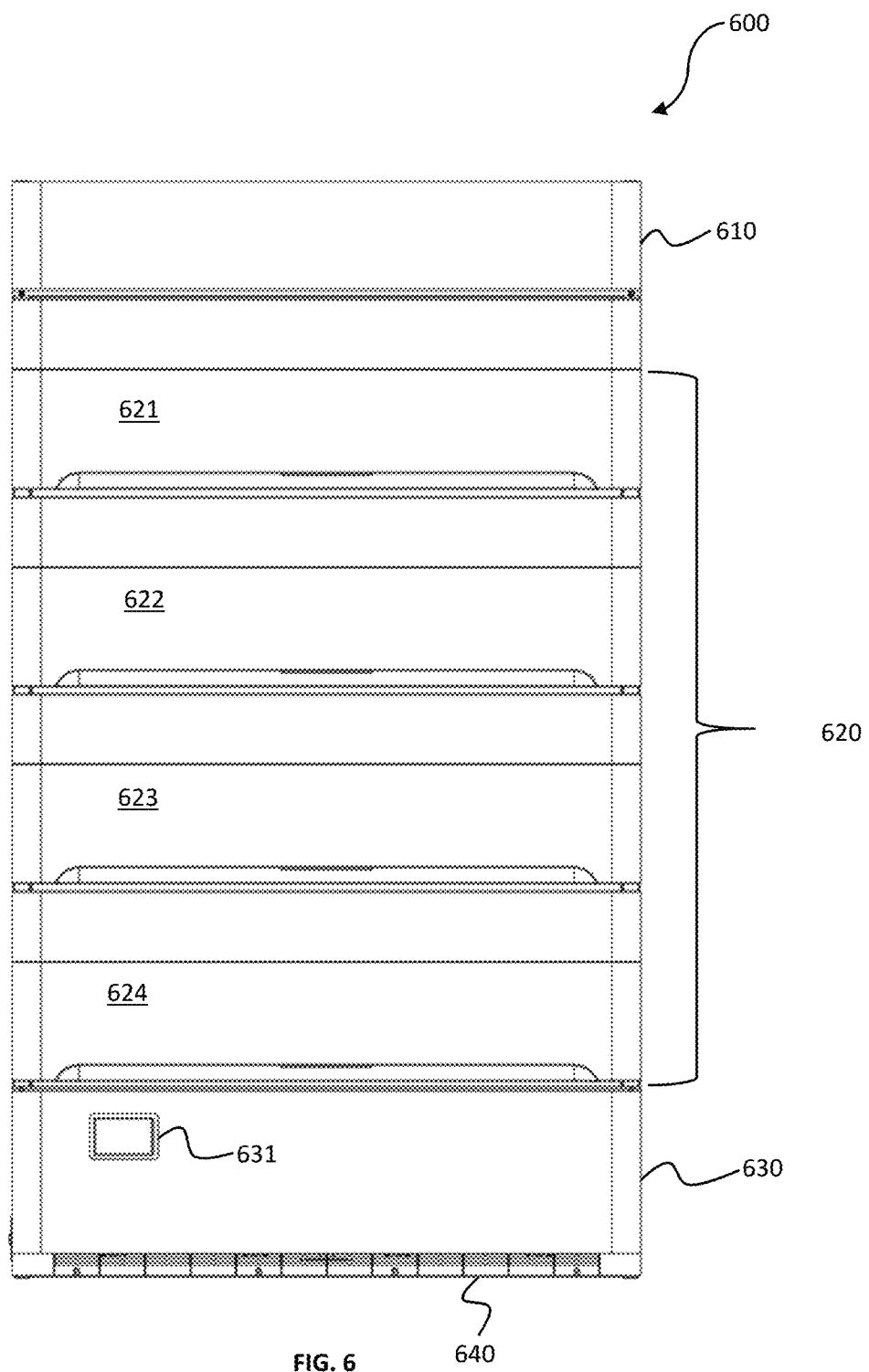
FIG. 6 is a schematic diagram of an exemplary growing enclosure of the environment simulating system in accordance with an embodiment of the present invention.

An exemplary embodiment of growing enclosure 501 where different plant and tree growing environments simulated are now described with reference to FIG. 6—FIG. 14. FIG. 6 illustrates a schematic diagram of a smart cabinet 600 which is an embodiment of growing enclosure 501. It will be noted that hereinafter, smart cabinet 600 and environment actuating apparatus 500 are referred to the same device.

In a general implementation of the present invention, smart cabinet 600 is a closed enclosure that includes a top section 610, a middle section 620, and a bottom section 630, each having a different growing environments. Top section 610 is dedicated for pre-gardening and controlling functions. Middle section has a plurality of growing drawers 621-624 for growing different plants and trees depending on their specific growing environments. Each of plurality of growing drawers 621-624 is separately simulated by methods 100-200. As described above in FIG. 1-FIG. 4, each growing drawers 621-624 has its own climate recipe which includes but not limited to pH level, nutrient ratio, light wavelengths and intensities, pressures, temperatures, humidity, winds speeds, amount of $CO_2$, etc. Bottom section 630 is dedicated to contain specific water-nutrient mixture containers for each specific plant in each specific drawers 621-624. In one exemplary embodiment of the present invention, bottom section 630 also includes a touchscreen display 631 for displaying and controlling the growing environment for each of growing drawers 621-624. Finally, an air outlet openings 640 are formed at the bottom of bottom section 630.

Figure 7A:
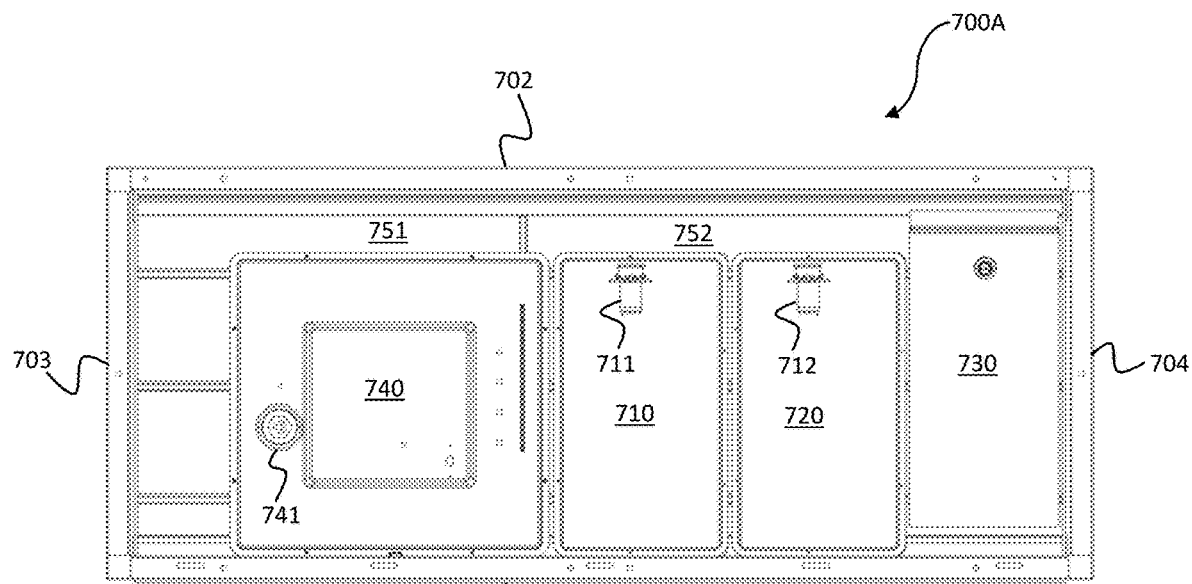
FIG. 7A is a top view of the top section of the growing enclosure in accordance with an embodiment of the present invention.

Now referring next to FIG. 7A, a schematic diagram of a top view of smart cabinet 600 that shows the components of a top section 700A is illustrated. As seen, top section 700A of smart cabinet 600 has a front side 701, a back side 702, a left side 703, and a right side 704. Top section 700 includes at least two containers 710-720 that are used to contain an organic solution, micro-controller 401 and sub-controller 402 and other electrical controllers described in FIG. 4 are contained inside a controller circuit box 730, at least two mixing tanks 740 where the mixing between water and organic solution occur to produce a specific water-nutrient solution mixture for a specific plant. Mixing tank 740 has a nutrient sensor 741 that measures the water-nutrient ratio of a specific water-nutrient solution mixture in term of total dissolved solution (TDS) or par per million (PPM). Similarly, at least two containers 710-720 have nutrient sensors 711 and 721 respectively. Top section 700A also contains a pair of suction fans and air filters 751-752 designed to create a clean air flow within smart cabinet 600. In one exemplary embodiment of the present invention, the speed of suction fans and air filters 751-752 are controlled by sub-controller circuit 402.

Figure 7B:
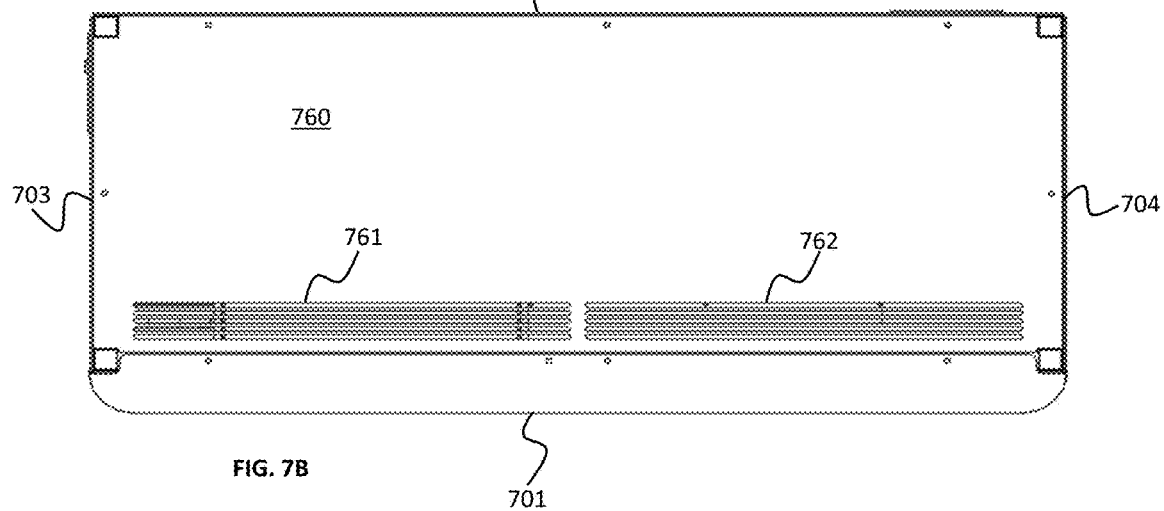
FIG. 7B is a top view of the top section of the growing enclosure with a the array of air input slits in accordance with an embodiment of the present invention.

Continuing with FIG. 7B, a schematic diagram of top section 610 with the lid fastened thereon so that air input slits are shown. A lid 760 with arrays of air input slits 761-762 is fastened on top of top section 610. In many aspects of the present invention, an air circulation whose speed can be controlled by sub-controller circuit 402 is formed inside smart cabinet 600. Air is entered into arrays of input slits 761-762, filtered to exclude impurities, circulated inside each drawers 621-624, and exited at air outlet openings 640. The detailed air circulation system of the present invention is described later.

Figure 8:
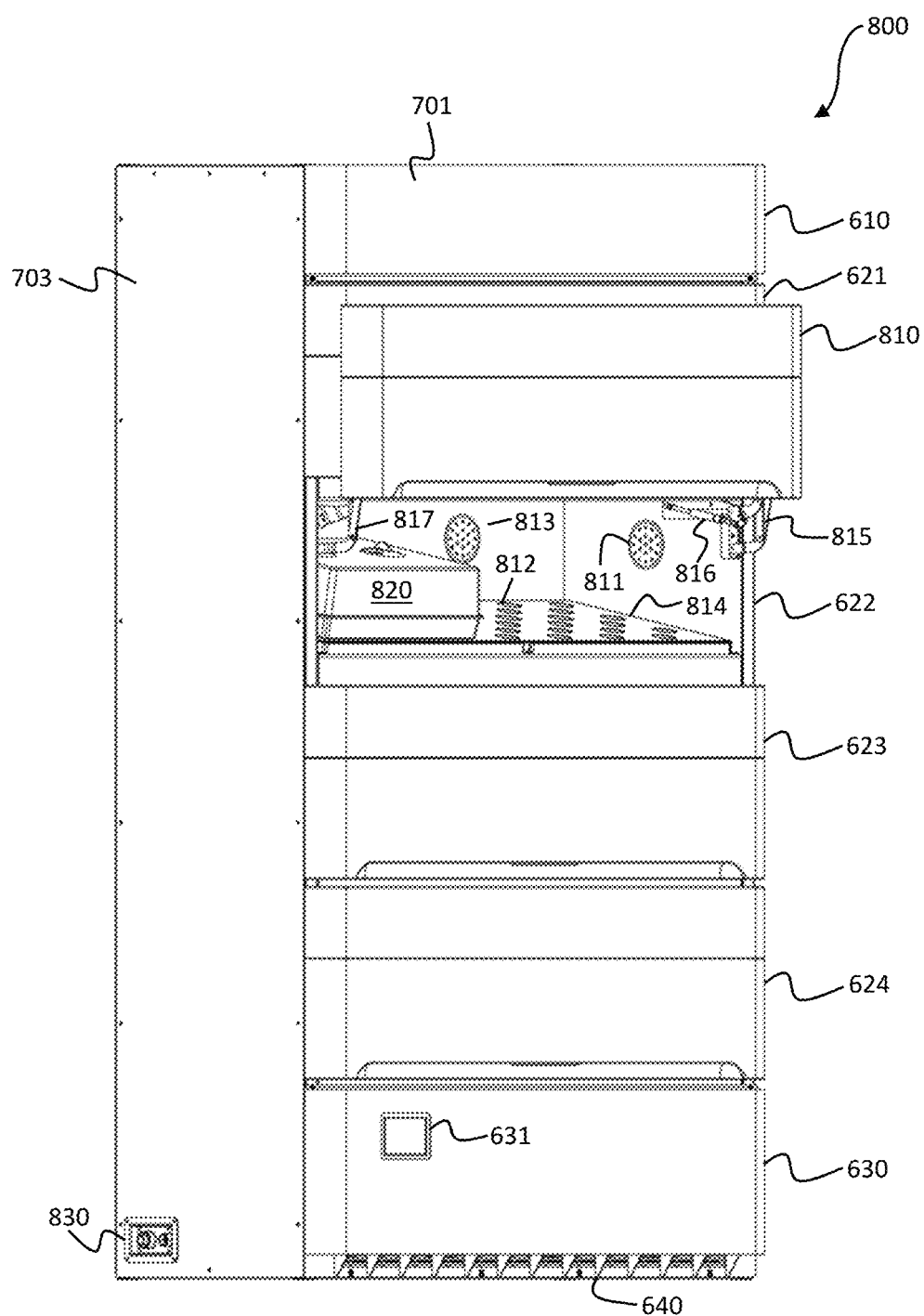
FIG. 8 is a perspective diagram showing the open position of a vertical lift door exposing the inner structure of a plant growing area of the environment simulating system in accordance with an embodiment of the present invention.

Next referring to FIG. 8, a perspective diagram showing the open position of a vertical lift door 810 exposing the inner structure 800 of a drawer of the smart cabinet for home gardening in accordance with an embodiment of the present invention is illustrated. Vertical lift door 810 is attached to the right inner wall of drawer 622 by an upward curved hinge 815. A second curved hinge 816 attaches vertical lift door 810 to the left inner wall of drawer 622. A right pneumatic arm 816 and a left pneumatic arm 818 (not shown) is connected to cause vertical lift door 810 to open or close in a fashion that is almost parallel to the front surface of smart cabinet 600. Inside drawer 622, a plant growing tray 811 with an array of circular openings are formed on the top surface of plant growing tray 811. In one exemplary embodiment of the present invention, seedling box 820 is placed inside growing drawers 621-624 to grow seedlings for a specific plants. On the back wall 702, a pair of air inlet openings 813 are placed on the back wall of drawer 622. On the right side wall, an air outlet opening 814 is posited. Near the bottom of right side 702, a water input/output faucet 830 that receives water from an external source is located.

Figure 9:
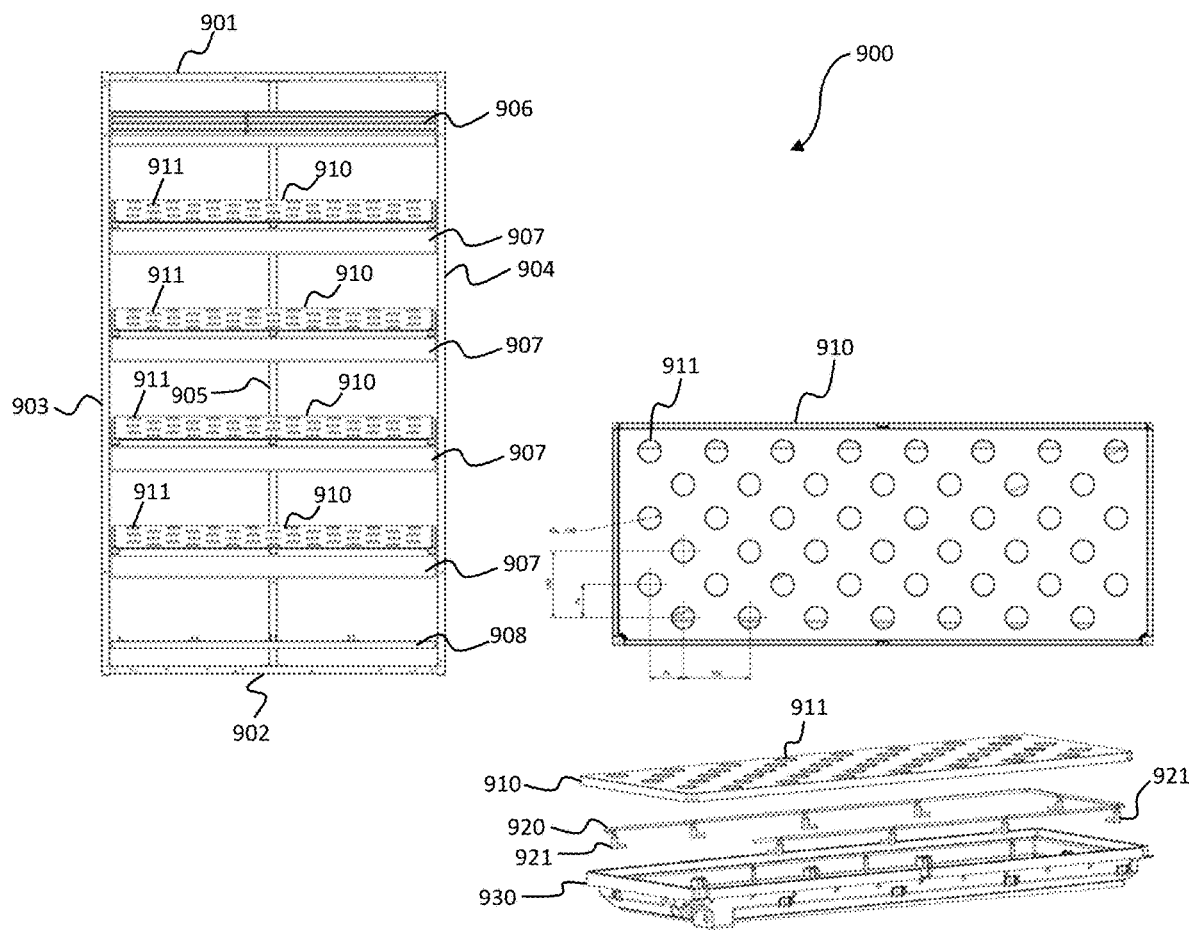
FIG. 9 is a schematic diagram illustrating the frame structure of the growing enclosure and the components of a plant growing area in accordance with an exemplary embodiment of the present invention.

FIG. 9 is a schematic diagram illustrating a frame structure 900 of the smart cabinet and the components of the plant growing tray in accordance with an exemplary embodiment of the present invention. Frame structure 900 is made of metal frames including top frame bars 901, bottom frame bars 902, left frame bars 903, and right frame bars 904 mechanically connected together. Atop section base 906, middle section bases 907, and a bottom base 908 are mechanically connected to frame structure 900 to form top section 610, middle section 620, and bottom section 630 respectively as described in FIG. 6 above. A vertical bar 905 mechanically connects top bars 901, bases 906-908, and bottom base 908 together to strengthen frame structure 900. A plurality of plant growing trays 910 is fastened to each middle section bases 907. As alluded above, plant growing tray 910 has an array of circular sprinkler 911 for growing a specific plant. Right underneath plant growing tray 910 is a tube 920 and sprinkler heads 921 that directly spray water-nutrient solution mixture directly to roots of the specific plant grown on each circular opening 911. In one exemplary embodiment, spraying tube 920 is formed around the perimeter to plant growing tray 910 and a water container 930. Water container 930 is laid underneath plant growing tray 910 to collect excess water.

Figure 10:
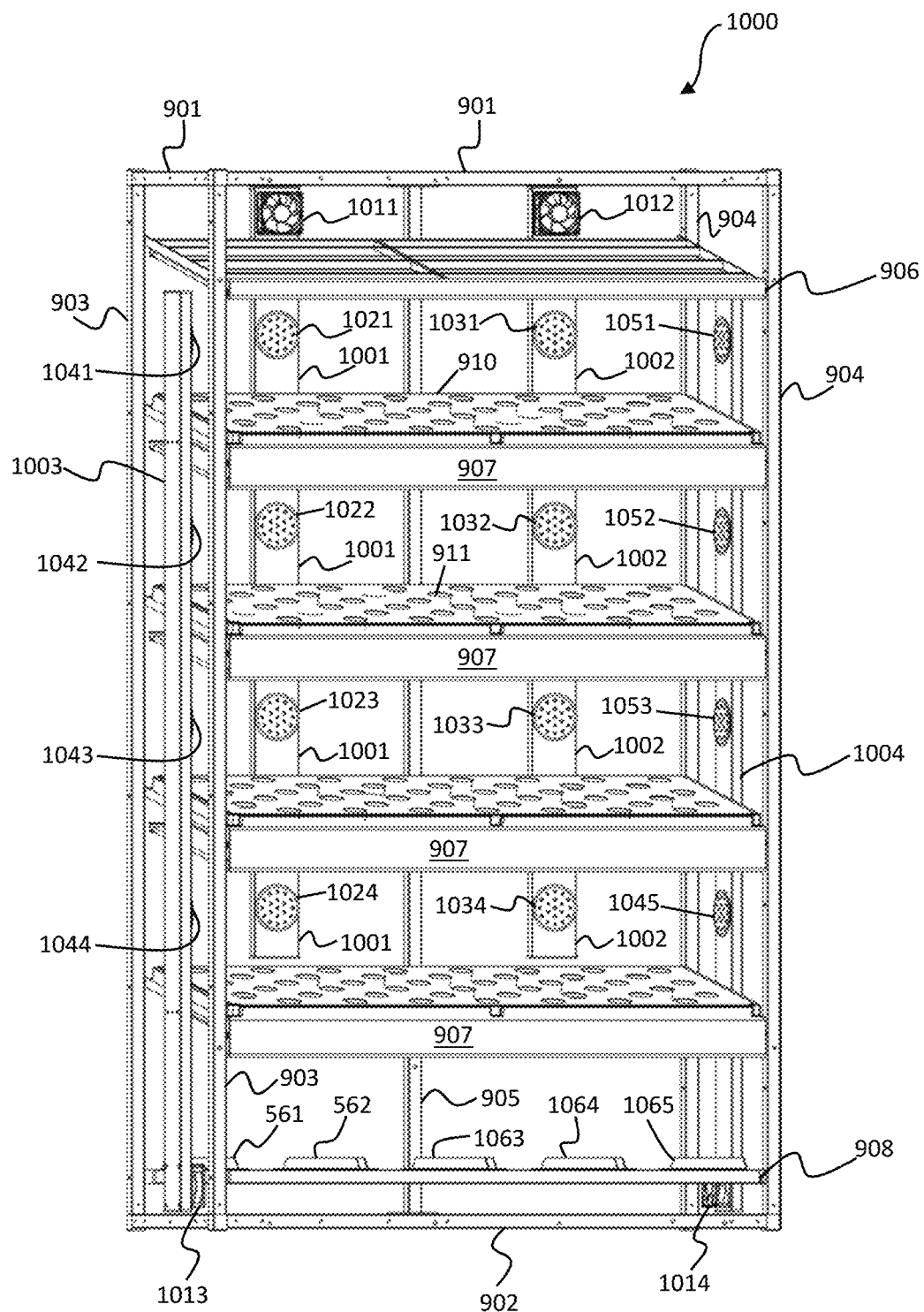
FIG. 10 is a schematic diagram illustrating the frame and the air circulation system of a growing enclosure in accordance with an exemplary embodiment of the present invention.

Referring next to FIG. 10, a schematic diagram illustrating the frame and the air circulation system 1000 of smart cabinet 600 in accordance with an exemplary embodiment of the present invention is illustrated. As described in FIG. 9 above, smart cabinet 900 is built from frame structure 900 made of top frame bars 901, bottom frame bars 902, left frame bars 903, and right frame bars 904 mechanically connected together. A first hollow rectangular tube 1001 and a second hollow rectangular tube 1002 are connected to frame 900, top section bases 906, middle section bases 907, and bottom section 908, which is parallel to vertical bar 905. In the space of top section 1010, first air suction fan 1011 and a second air suction fan 1012 are connected face first to first hollow rectangular tube 1001 and second hollow rectangular tube 1002 respectively. A third hollow rectangular tube 1003 is connected to left frame bars 903 and a fourth hollow rectangular tube 904 is connected to right frame bars 904. In the space of bottom section 630, a third air suction fan 1013 is connected to third hollow rectangular tube 1003, and a fourth air suction fan 1014 is connected to fourth hollow rectangular tube 1004. Controller circuit provides power supplies and control the speed of all four suction fans 1011-1014. In one exemplary embodiment of the present invention, first air suction fan 1011 and second air suction fan 1012 are includes air filters (not shown) to filter out impurities from the ambient environment outside of smart cabinet 600. It is noted that first air suction fan 1011 is the same as first suction fan and air filter 751 and second air suction fan 1012 is the same as second suction fan and air filter 752. Referring back to FIG. 6, in the space of first drawer 621, four circular air openings 1021, 1031, 1041, and 1051 are connected to first hollow rectangular tube 1001, second hollow rectangular tube 1002, third hollow rectangular tube 1003, and fourth hollow rectangular tube 1004 respectively. Similarly, in the space of second drawer 622, four circular air openings 1022, 1032, 1042, and 1052 are connected to first hollow rectangular tube 1001, second hollow rectangular tube 1002, third hollow rectangular tube 1003, and fourth hollow rectangular tube 1004 respectively. In the space of third drawer 623, four circular air openings 1023, 1033, 1043, and 1053 are connected to first hollow rectangular tube 1001, second hollow rectangular tube 1002, third hollow rectangular tube 1003, and fourth hollow rectangular tube 1004 respectively. Finally, in the space of fourth drawer 624, four circular air openings 1024, 1034, 1044, and 1054 are connected to first hollow rectangular tube 1001, second hollow rectangular tube 1002, third hollow rectangular tube 1003, and fourth hollow rectangular tube 1004 respectively. In the space of bottom section 624, four base areas 1062-1065 are dedicated to four water-nutrient solution mixture chambers (will be shown in FIG. 11). An area 1061 is dedicated to touchscreen display and 631 circuitry is shown.

Referring again to FIG. 10, in operation, first air suction fan 1011 and second air suction are located in top section 610 close to first array of air input slits 761 and second array of air input slits 762. Third air suction fan 1013 and fourth air suction fan 1014 are located in bottom section 630 close to air outlet openings 640. When turned on, first air suction fan 1011 and second air suction fan 1012 draw and filter air from outside into top section 610. This filtered air is drawn vertically downward because of gravity. In first growing drawer 621, air is pushed down via first hollow rectangular tube 1021 and second hollow rectangular tube 1031. This air is entered and filled first growing drawer 621 via first circular opening 1021 and second circular opening 1031. Then, air is pushed out of first growing drawer 621 via third circular opening 1041 and fourth circular opening 1051. The same air circulation event happens in second growing drawer 622 via first, second, third, fourth hollow rectangular tubes 1001-1004, air circular openings 1022, 1032, 1042, and 1052. Then, air is circulated in third growing drawer 623 via first, second, third, fourth hollow rectangular tubes 1001-1004, air circular openings 1023, 1033, 1043, and 1053. Finally, air is pushed down to fourth growing drawer 624 via first, second, third, fourth hollow rectangular tubes 1001-1004, air circular openings 1024, 1034, 544, and 1054. After providing air, and other gases such as carbon dioxide ($CO_2$) for photosynthesis, air is exited smart cabinet 600 via air outlet openings 640.

Figure 11:
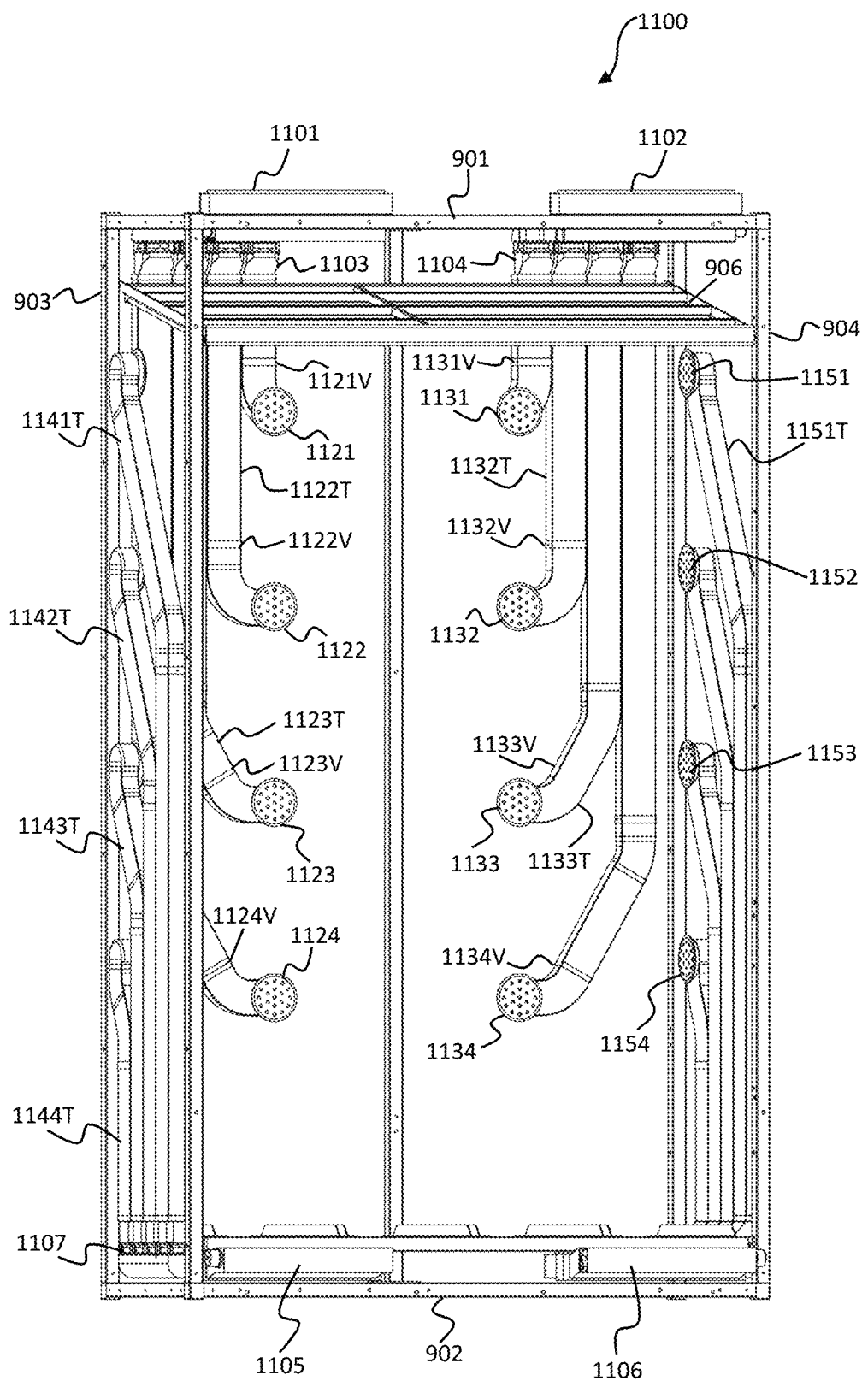
FIG. 11 is a schematic diagram of another air circulation system in accordance with an embodiment of the present invention.

Referring to FIG. 11, another exemplary embodiment of air circulation system 1100 of the present invention is illustrated. Air circulation system 1100 includes a first general-area blowing fan 1101 located on the top left side of cabin frame 900, a second general-area blowing fan 1102 for the top right side, first drawer-specific blowing fan 1103 a second drawer-specific blowing fan 1104, a third general-area suction fan 1105 located on the bottom left side of cabin frame 900, a fourth general-area suction fan 1106, a third drawer-specific suction fan for the bottom left side 1107, and a fourth drawer-specific air suction fan for the bottom right side 1108 (not shown).

In the back of first drawer 621, a first air guide tube 1121T is in communication with first drawer-specific fan 1103 that guides air flow to a first circular air opening 1121. The amount of air flow is controlled by a first air controlling valve 1121V. The speed of air flow is controlled by both first general-area blowing fan 1101 and first drawer-specific blowing fan 1103. Also in the back of first drawer 621, a second air guide tube 1131T is in communication with second drawer-specific fan 1104 that guides air flow to a first circular air opening 1131. The amount of air flow into first drawer 621 via second air guide tube 1131T is controlled by a second air controlling valve 1131V. On the left hand side of first drawer 621, a third air guide tube 1141T is in communication with first drawer-specific fan 1103 that guides air flow to a third circular air opening 1141. The amount of air flow into first drawer 621 via third air guide tube 1141T is controlled by a third air controlling valve 1141V. Similarly, On the right hand side of first drawer 621, a fourth air guide tube 1151T is in communication with second drawer-specific fan 1104 that guides air flow to a fourth circular air opening 1151. The amount of air flow into first drawer 621 via fourth air guide tube 1151T is controlled by a fourth air controlling valve 1151V.

Continuing with FIG. 11, In the back of second drawer 622, a first air guide tube 1122T is in communication with first drawer-specific fan 1103 that guides air flow to a first circular air opening 1122. The amount of air flow is controlled by a first air controlling valve 1122V. The speed of air flow is controlled by both first general-area blowing fan 1101 and first drawer-specific blowing fan 1103. Also in the back of second drawer 622, a second air guide tube 1132T is in communication with second drawer-specific fan 1004 that guides air flow to a first circular air opening 1132. The amount of air flow into second drawer 622 via second air guide tube 1132T is controlled by a second air controlling valve 1132V. On the left hand side of second drawer 622, a third air guide tube 1142T is in communication with first drawer-specific fan 1103 that guides air flow to a third circular air opening 1142. The amount of air flow into second drawer 622 via third air guide tube 1142T is controlled by a third air controlling valve 1142V. Similarly, On the right hand side of second drawer 622, a fourth air guide tube 1152T is in communication with second drawer-specific fan 1104 that guides air flow to a fourth circular air opening 1151. The amount of air flow into first drawer 621 via fourth air guide tube 1152T is controlled by a fourth air controlling valve 1152V.

Continuing with FIG. 11, in the back of third drawer 623, a first air guide tube 1123T is in communication with first drawer-specific fan 1103 that guides air flow to a first circular air opening 1123. The amount of air flow is controlled by a first air controlling valve 1123V. The speed of air flow is controlled by both first general-area blowing fan 1101 and first drawer-specific blowing fan 1103. Also in the back of third drawer 623, a second air guide tube 1133T is in communication with second drawer-specific fan 1004 that guides air flow to a second circular air opening 1133. The amount of air flow into third drawer 623 via second air guide tube 1133T is controlled by a second air controlling valve 1133V. On the left hand side of third drawer 623, a third air guide tube 1143T is in communication with first drawer-specific fan 1103 that guides air flow to a third circular air opening 1143. The amount of air flow into third drawer 623 via third air guide tube 1143T is controlled by a third air controlling valve 1143V. Similarly, On the right hand side of third drawer 623, a fourth air guide tube 1153T is in communication with second drawer-specific fan 1104 that guides air flow to a fourth circular air opening 1153. The amount of air flow into third drawer 623 via fourth air guide tube 1153T is controlled by a fourth air controlling valve 1153V.

Referring finally to FIG. 11, in the back of fourth drawer 624, a first air guide tube 1124T is in communication with first drawer-specific fan 1103 that guides air flow to a first circular air opening 1124. The amount of air flow is controlled by a first air controlling valve 1124V. The speed of air flow is controlled by both first general-area blowing fan 1101 and first drawer-specific blowing fan 1103. Also in the back of fourth drawer 624, a second air guide tube 1134T is in communication with second drawer-specific fan 1104 that guides air flow to a second circular air opening 1134. The amount of air flow into fourth drawer 624 via second air guide tube 1134T is controlled by a second air controlling valve 1134V. On the left hand side of fourth drawer 624, a third air guide tube 1144T is in communication with first drawer-specific fan 1103 that guides air flow to a third circular air opening 1144. The amount of air flow into fourth drawer 624 via third air guide tube 1144T is controlled by a third air controlling valve 1144V. Similarly, On the right hand side of fourth drawer 624, a fourth air guide tube 1154T is in communication with second drawer-specific fan 1104 that guides air flow to a fourth circular air opening 1154. The amount of air flow into fourth drawer 624 via fourth air guide tube 1154T is controlled by a fourth air controlling valve 1154V.

All air controlling valves 1121V, 1131V, 1141V, 1151V, 1122V, 1132V, 1142V, 1152V, 1123V, 1133V, 1143V, 1153V, 1124V, 1134V, 1144V, and 1154V are solenoid valves. With the described structure of air circulation system 1100, the quantity and speed of air flow in each drawer can be easier and more accurately controlled.

Figure 12:
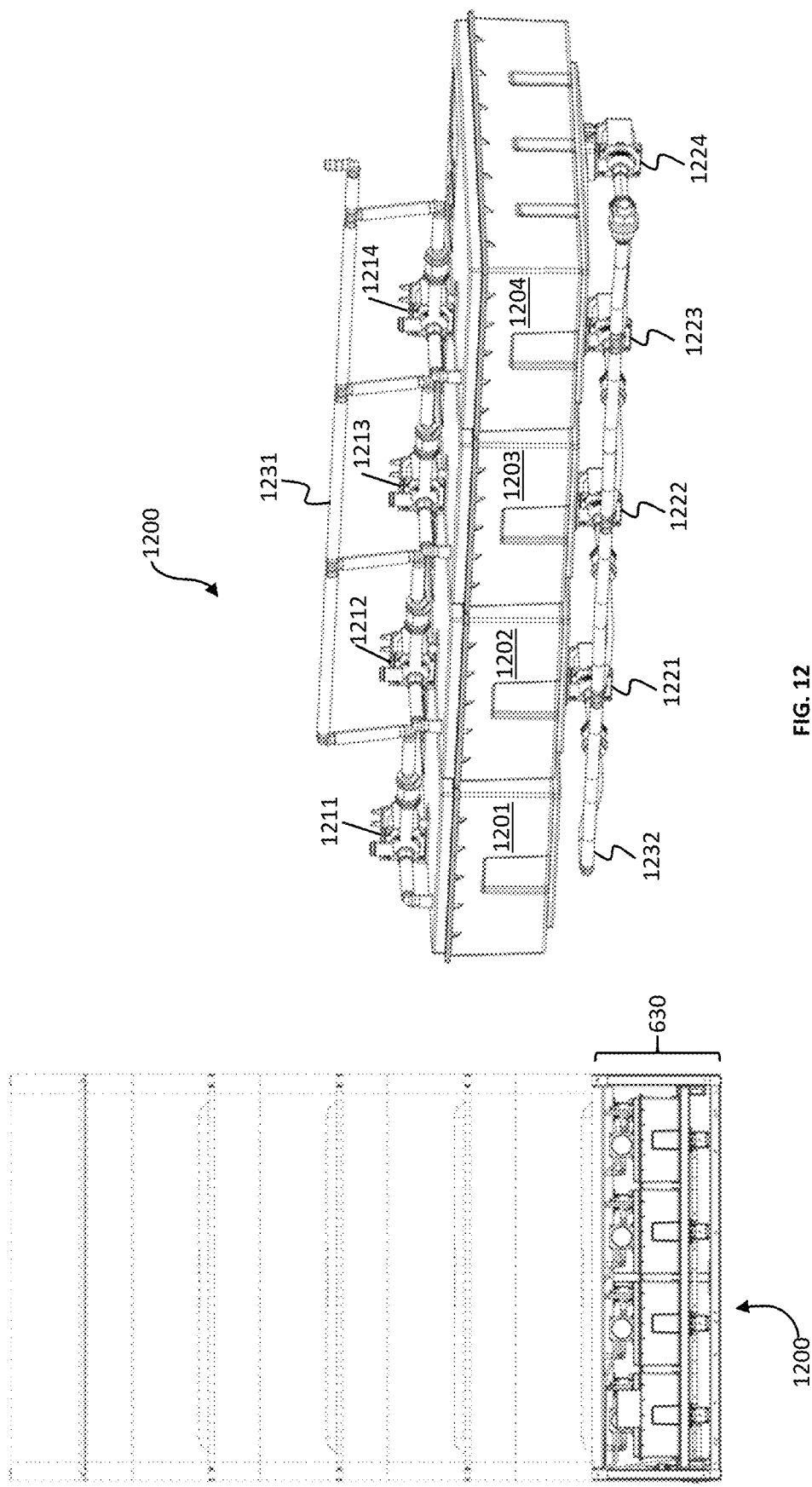
FIG. 12 is a schematic diagram illustrating the water-nutrient solution mixture containers—one for each plant growing area—in the bottom section of the environment simulating system in accordance with an exemplary embodiment of the present invention.

FIG. 10 and FIG. 11 above discloses the air ventilation system built-in into the frame of smart cabinet 600, now FIG. 12 and FIG. 13 disclose the water-nutrient solution distribution system in accordance with various embodiments of the present invention.

Referring now to FIG. 12, a schematic diagram illustrating the water-nutrient solution mixture containers 1200—one for each growing drawer—in the bottom section 630 of smart cabinet 600 in accordance with an exemplary embodiment of the present invention. As shown, water-nutrient solution mixture containers 1200 includes a first water-nutrient solution mixture container 1201 for first growing drawer 621, a second water-nutrient solution mixture container 1202 for second growing drawer 622, a third a first water-nutrient solution mixture container 1203 for first growing drawer 623, and a fourth water-nutrient solution mixture container 1204 for first growing drawer 624. Next, a first distribution pump/valve device 1211 is connected to first water-nutrient solution mixture container 1201, a second distribution pump/valve device 1212 is connected to first water-nutrient solution mixture container 1202, a third distribution pump/valve device 1213 is connected to third water-nutrient solution mixture container 1203, and a fourth distribution pump/valve device 1214 is connected to fourth water-nutrient solution mixture container 1204. A distribution conduit 1231 connects all distribution pump/valve devices 1211-1214 to containers 1201-1204 together. To control the temperature of each water-nutrient solution mixture device 1201-1204, a first cooling valve 1221 is connected to control the temperature of first water-nutrient solution mixture container 1201, a first cooling valve 1222 is connected to control the temperature of second water-nutrient solution mixture container 1202, a third cooling valve 1223 is connected to control the temperature of third water-nutrient solution mixture container 1203, and a fourth cooling valve 1224 is connected to control the temperature of fourth water-nutrient solution mixture container 1204. A cooling conduit 1232 connects all cooling valves 1221-1224 and containers 1201-1204 to a cooling system (not shown).

Now FIG. 13A-FIG. 13B describes the water circulation system of the present invention. FIG. 3A shows a schematic diagram of the water circulation system 1300A from mixing tank 740 to water-nutrient solution mixture containers 1201-1204. Connection pipe 1321 connects mixing tank 240 to a first receiving pump/valve 1311, a second receiving pump/valve 1312, a third receiving pump/valve 1313, and a fourth receiving pump/valve 1314. First receiving pump/valve 1311 is in turn connected to first water-nutrient solution container 1201 to provide water nutrient to first growing drawer 621. Second receiving pump/valve 1312 is connected to second water-nutrient solution container 1202 to provide nutrient to second growing drawer 622. Third receiving pump/valve 1313 is connected to third water-nutrient solution container 1203 to provide nutrient to third growing drawer 623. Fourth receiving pump/valve 1314 is connected to fourth water-nutrient solution container 1204 to provide nutrient to fourth growing drawer 622. First to fourth distribution pump/valve devices 1211-1214 and first to fourth receiving pump/valve 1311-1314 form a complete water circulation system as described in FIG. 13B as followed.

Referring now to FIG. 13B, a schematic diagram of a complete water circulation system 1300B in accordance with an exemplary embodiment of the present invention is shown. From top section 610, mixing tank 740, after received the correct water-nutrient solution mixture from first and second organic containers 710 and 720, shall fill up either first to fourth water-nutrient solution mixture containers 1201-1204 by distribution pipes 1331. First to fourth receiving pump/valve devices 1311-1314 under the control of sub-controller circuit 402 decides which water-nutrient solution mixture containers 1201-1204 be filled. Similarly, this filling-in sequence of the proper water-nutrient solution mixtures for all water-nutrient solution mixture containers 1201-1204 is completed. Then, sub-controller 402 decides which first to fourth water-nutrient solution mixture containers 1201-1204 to supply water-nutrient mixtures to which water tray 1351-1354. In one exemplary embodiment of the present invention, first water-nutrient solution mixture container 1201 supplies water nutrient solution mixture for first water tray 1351 in first growing drawer 621 via first water pipe 1301 where group I type of plants such as cress adapted to grow in a water-nutrient ratio of approximate 40 part per million (ppm) and pH level between 6.0 to 7.0. Second water-nutrient solution mixture container 1202 supplies water nutrient solution mixture for second water tray 1352 in second growing drawer 622 via second water pipe 1302 where group II type of plants such as artichokes, corianders, asparagus, lettuce, cinnamon adapted to grow in a water-nutrient ratio of approximate 540-1,000 part per million (ppm) and pH level between 6.0 to 7.0. Third water-nutrient solution mixture container 603 supplies water nutrient solution mixture for third water tray 1353 in third growing drawer 623 via third water pipe 1303 where group III type of plants such as beans, bell peppers, carrots, cauliflowers, radishes, mints, and basils adapted to grow in a water-nutrient ratio of approximate 1,200-1,600 part per million (ppm) and pH level between 6.0 to 6.5. Fourth water-nutrient solution mixture container 1204 supplies water nutrient solution mixture for fourth water tray 1354 in fourth growing drawer 624 via fourth water pipe 1304 where group 4 type of plants such as tomatoes, cabbage, and beans adapted to grow in a water-nutrient ratio of approximate 1,700-2,100 part per million (ppm) and pH level between 5.5 to 6.5. It is noted that any groups of plants and trees with suitable water-nutrient ratio in ppm or in TDS and pH level range can be grown using smart cabinet 600 of the present invention and that the present invention is not limited to the groups of plants cited above. Any excess water in first to fourth water trays 1351-1354 is returned to appropriate water-nutrient solution mixture containers 1301-1304 via receiving pump/valve devices 1311-1314.

Figure 14B:
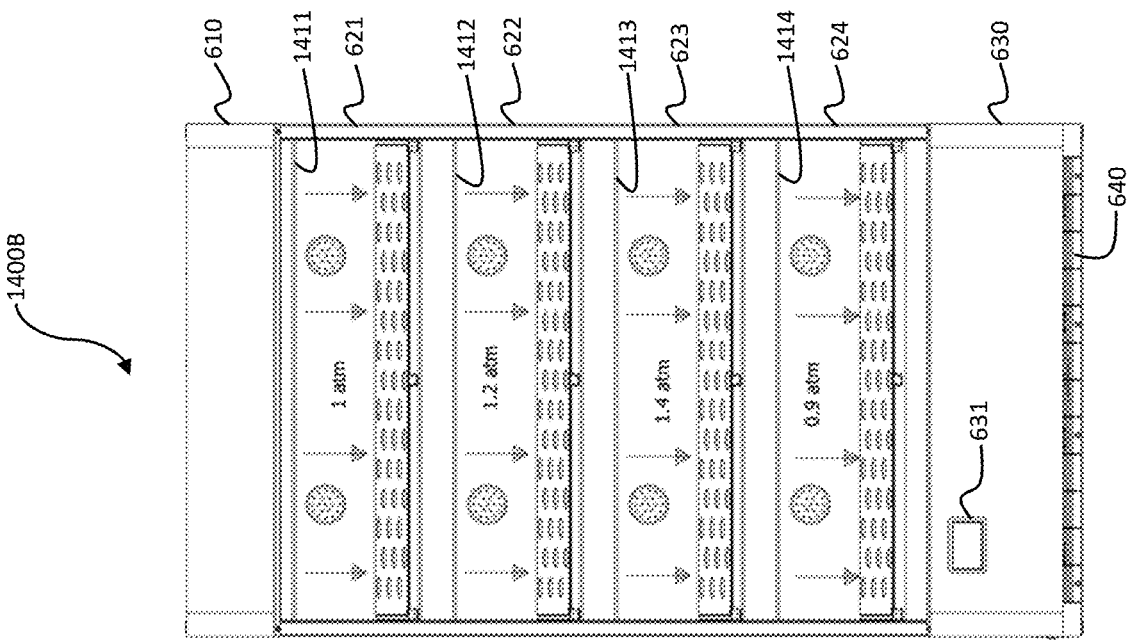
FIG. 14B is a schematic diagram of the plant growing area with the lighting system in each of the plant growing area in accordance with an embodiment of the present invention.
Figure 14A:
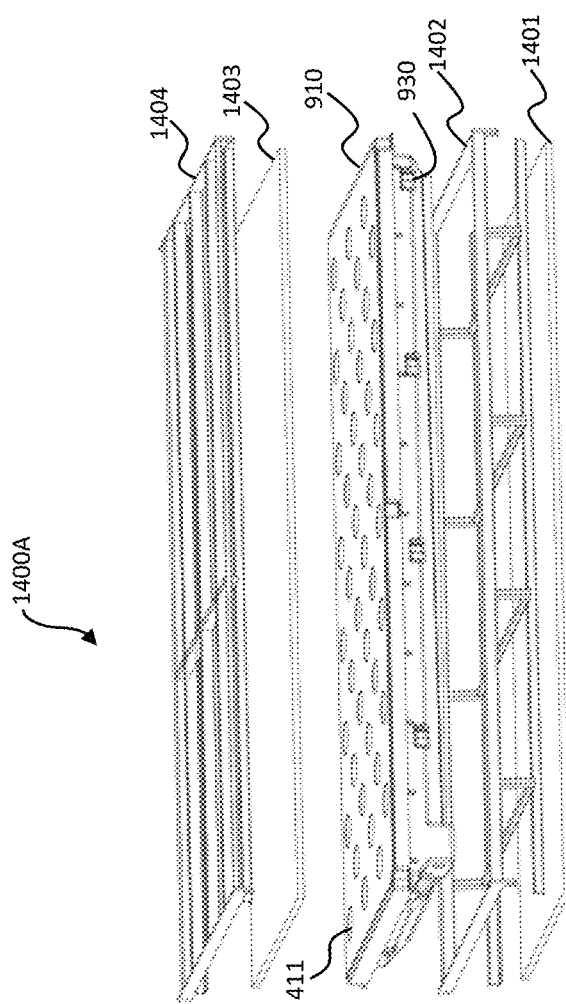
FIG. 14A is a schematic diagram of a lighting system integrated into a plant growing area in accordance with an embodiment of the present invention.

Next, referring to FIG. 14, a schematic diagram of a lighting system 1400A integrated into a plant growing tray in accordance with an embodiment of the present invention is shown. From the bottom, a base 1401 is laid on middle section base 910, a base frame 1402 contains water container 930 and sprinkler heads 921. Next, lighting system 1400A includes a glass cover 1403 is connected to an array of lights 1404. In one exemplary embodiment of the present invention, array of lights 1404 is made of an array of light emitting diodes (LEDs) configured to operate in the visual spectrum of wavelengths ranging from 380 nm to 880 nm. However, it is noted that any wavelengths suitable to cultivate any plants/vegetables are within the scope of the present invention.

Now, FIG. 14B shows a schematic diagram of smart cabinet 600 having lighting system 1400B in each of plurality of growing drawers 621-624 in accordance with an exemplary embodiment of the present invention. A first LED lighting system 1411 is connected to the roof of first growing drawer 621, a second LED lighting system 1212 is connected to the roof of second growing drawer 622, a third LED lighting system 1413 is connected to the roof of third growing drawer 623, and a fourth LED lighting system 414 is connected to the roof of fourth growing drawer 624. As such the lighting systems 1411-1414, air circulation systems 1021-1051, 1022-1052, 1023-1053, 1024-1054, array of air input slits 760-761, air output slits 640, water circulation systems 1200-1300 as described in FIG. 12, FIG. 13A, and FIG. 13 form a simulated environment for each of growing drawers 621-624. As alluded above, the automatic precision weather system is controlled by sub-controller 401 to mimic a specific favorable plant growing condition and environment in each of growing drawer 621-624. In one exemplary embodiment of the present invention, growing enclosure is controlled by micro-controller 401, and sub-controller 402 to set the growing conditions and climate recipe in first growing drawer 621 to 1.0 atmospheric pressure, that in second growing drawer 622 to 1.2 atmospheric pressure, 1.4 atmospheric pressure in third growing drawer 623, and 0.9 atmospheric pressure in plant growing drawer 624. In another exemplary embodiment, simulated environment in each of growing drawers 621-624 can be set and observed from touch screen display 630.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS

300 Environment Simulating System
301 Wireless communication channel
302 RTS-485 bus
310 Customers' computer devices
311 Cloud Wide Area Network (WAN)
312 Database containing plant recipes
320 A plurality of customer environment simulating apparatus
321 At least two controllers including microcontroller and sub-controller
322 Climate and environment actuators
323 Plant and vegetable growing enclosure
324 Sensors
401 Micro-controller
402 Sub-controller circuit
403 Database containing a library of plant recipes
411 LiDAR sensor
412 pH sensor (meter)
413 TDS sensor
414 Water level sensor
421 Real-time Camera or Video
422 Ethernet interface
423 Wi-Fi card
424 RF module
425 Wi-Fi interface 426 Touchscreen display
431 Solenoid valves
432 Liquid (water & nutrient) pumps
433 CO₂ module
434 LED driver
435 Air fans
436 Mist spraying module
437 Air conditioning module
438 Vacuum module
439 Water chiller module
440 Water sprinkler module
500 Environment simulating apparatus
501 Growing enclosure
502 LED array and driver
503 water sprinkler module
504 Air conditioning module
505 Mist spraying module
506 Vacuum module
507 Blowing fans
508 Suction fans
509 Unidirectional air valves
510 Air exit windows
511 Plant growing trays
512 Unidirectional water valves
513 CO₂ regulator
514 Ultraviolet (UV) sterilizer module
516 Water source
520 Direction of air flow
521 Direction of water flow
600 Smart cabinet or environment simulating system
610 Top section
620 Middle section
621 First drawer for growing a first type of plant
622 Second drawer for growing a second type of plant
623 Third drawer for growing a third type of plant
624 Fourth drawer for growing a fourth type of plant
630 Bottom section
631 Touch screen display
640 Air outlet openings at the bottom side of the smart cabinet
700 Top view of the top section that shows the internal components
701 Front side
702 Back side
703 Left side
704 Right side
710 First organic solution container
711 First nutrient pump
720 Second organic solution container
721 Second nutrient pump
730 Controller circuit
740 Mixing tank
741 Water pump
751 First suction fan and air filter
752 Second suction fan and air filter
760 Top section lid
761 First array of air input slits
762 Second array of air input slits
800 Structure of inner structure of a drawer
810 Vertical lift door
811 Plant growing tray
812 Array of circular openings
813 Air inlet openings
814 Air outlet openings
815 First upward curved hinge
816 First pneumatic arm
817 Second upward curve hinge
818 Second pneumatic arm
820 Seedling box
830 Input/output water faucet
900 Cabinet frame
901 Top frame bars
902 Bottom frame bars
903 Left frame bars
904 Right frame bars
905 Vertical bar
906 Top section base
907 Middle section bases
908 Bottom section base
910 Plant growing tray in general
911 Array of circular openings
920 Tube
921 Sprinkler heads
930 Water container
1001 First hollow rectangular tube
1002 Second hollow rectangular tube
1003 Third hollow rectangular tube
1004 Fourth hollow rectangular tube
1011 First air suction fan
1012 Second air suction fan
1013 Third air suction fan
1014 Fourth air suction fan
1021 First circular air opening in first drawer
1031 Second air opening in first drawer
1041 Third air opening in first drawer
1051 Fourth air opening in first drawer
1022 First circular air opening in second drawer
1032 Second air opening in second drawer
1042 Third air opening in second drawer
1052 Fourth air opening in second drawer
1023 First circular air opening in third drawer
1033 Second air opening in third drawer
1043 Third air opening in third drawer
1053 Fourth air opening in third drawer
1024 First circular air opening in fourth drawer
1034 Second air opening in fourth drawer
1044 Third air opening in fourth drawer
1054 Fourth air opening in fourth drawer
1101 First general-area blowing fan for the top left side
1102 Second general-area blowing fan for the top right side
1103 First drawer-specific blowing fan for the top left side
1104 Second drawer-specific blowing fan for the top right side
1105 Third general-area suction fan for the bottom left side
1106 Fourth general-area suction fan for the bottom right side
1107 Third drawer-specific suction fan for the bottom left side
1121 First circular air opening in the first drawer
1121V First air controlling valve in the first drawer
1121T First air guide tube in the first drawer
1131 Second circular air opening in the first drawer
1131V Second air controlling valve in the first drawer
1131T Second air guide tube in the first drawer
1141 Third circular air opening in the first drawer
1141V Third air controlling valve in the first drawer
1141T Third air guide tube in the first drawer
1151 Fourth circular air opening in the first drawer
1151V Fourth air controlling valve in the first drawer
1151T Fourth air guide tube in the first drawer
1122 First circular air opening in the second drawer
1122V First air controlling valve in the second drawer 1122T First air guide tube in the second drawer
1132 Second circular air opening in the second drawer
1132V Second air controlling valve in the second drawer
1132T Second air guide tube in the second drawer
1142 Third circular air opening in the second drawer
1142V Third air controlling valve in the second drawer
1142T Third air guide tube in the second drawer
1152 Fourth circular air opening in the second drawer
1152V Fourth air controlling valve in the second drawer
1152T Fourth air guide tube in the second drawer
1123 First circular air opening in the third drawer
1123V First air controlling valve in the third drawer
1123T First air guide tube in the third drawer
1133 Second circular air opening in the third drawer
1133V Second air controlling valve in the third drawer
1133T Second air guide tube in the third drawer
1143 Third circular air opening in the third drawer
1143V Third air controlling valve in the third drawer
1143T Third air guide tube in the third drawer
1153 Fourth circular air opening in the third drawer
1153V Fourth air controlling valve in the third drawer
1153T Fourth air guide tube in the third drawer
1124 First circular air opening in the fourth drawer
1124V First air controlling valve in the fourth drawer
1124T First air guide tube in the fourth drawer
1134 Second circular air opening in the fourth drawer
1134V Second air controlling valve in the fourth drawer
1134T Second air guide tube in the fourth drawer
1144 Third circular air opening in the fourth drawer
1144V Third air controlling valve in the fourth drawer
1144T Third air guide tube in the fourth drawer
1154 Fourth circular air opening in the fourth drawer
1154V Fourth air controlling valve in the fourth drawer
1154T Fourth air guide tube in the fourth drawer
1201 First water nutrient solution mixture container
1202 Second water nutrient solution mixture container
1203 Third water nutrient solution mixture container
1204 Fourth water nutrient solution mixture container
1211 First distribution pump/valve
1212 Second distribution pump/valve
1213 Third distribution pump/valve
1214 Fourth distribution pump/valve
1231 Distribution conduit
1232 Cooling conduit
1301 First water pipe
1302 Second water pipe
1303 Third water pipe
1304 Fourth water pipe
1311 First receiving pump/valve
1312 Second receiving pump/valve
1313 Third receiving pump/valve
1314 Fourth receiving pump/valve
1321 Connection pipe
1351 First water tray in first growing drawer
1352 Second water tray in second growing drawer
1353 Third water tray in third growing drawer
1354 Fourth water tray in fourth growing drawer
1401 Base
1402 Base frame
1403 Glass cover
1404 LED lighting system and frame
1411 LED lighting system for first growing drawer
1412 LED lighting system for second growing drawer
1413 LED lighting system for third growing drawer
1414 LED lighting system for fourth growing drawer
1500 Graph of intensity versus frequency of LEG lights

What is claimed is:

1. An environment simulating system, comprising:
    a database comprising a library of climate recipes characterizing growing environments for different plants and trees;
    a plurality of environment simulating apparatus; and
    a network server adapted to connect said database and said plurality of environment simulating apparatus to a network, wherein each of said plurality of environment simulating apparatus further comprises:
    a micro-controller electrically coupled to receive customer orders for said different plants and trees that are translated into said climate recipes;
    an environment actuating system, electrically coupled to said micro-controllers, operable to receive said climate recipes from said database;
    a sub-controller electrically coupled to receive said climate recipes from said micro-controller to drive said environment actuating system to mimick said growing environments in a growing enclosure in accordance with said orders; and
    an array of web-based sensors, coupled to said growing enclosure and said micro-controller, operable to sense growing conditions of said growing environments and to feedback said growing conditions to said micro-controllers.

2. The environment simulating system of claim 1 wherein said database is a MongoDB database and said network server comprises a Multi Queuing Telemetry Transport (MQTT) broker adapted to manage the communication between said plurality of environment simulating apparatus.

3. The environment simulating system of claim 1 wherein said environment actuating system further comprises:
    an array of LED lights and LED driver, electrically connected to said sub-controller, operable to provide different light wavelengths and intensities necessary for photosynthesis processes for said different plants and trees;
    a nutrient module, electrically connected to said sub-controller, operable to provide nutrients for said different plants and trees;
    a water circulation module, electrically connected to said sub-controller, operable to provide water for said different plants and trees,
    an air circulation module, electrically connected to said sub-controller, operable to provide air circulation for said different plants and trees;
    a carbondioxide ($CO_2$) module, electrically connected to said sub-controller, operable to provide carbon dioxide ($CO_2$) for said different plants and trees;
    a water chiller module, electrically connected to said sub-controller, operable to provide water temperatures for said different plants and trees;
    a mist spraying module, electrically connected to said sub-controller, operable to provide humidity for said different plants and trees;
    a water sprinkler module, electrically connected to said sub-controller, operable to provide water for said different plants and trees;
    a vacuum module, electrically connected to said sub-controller circuit, operable to control an amount of air particles within said growing enclosures; and
    an air conditioning module electrically connected to said sub-controller circuit, operable to control the temperatures within said growing enclosures.

4. The environment simulating system of claim 3 wherein said array of LED is capable of providing either a combination of full visible sunlight spectrum whose wavelengths range from 380 nm to 780 nm or special wavelength characteristics necessary for said photosynthesis processes of said different plants and trees.

5. The environment simulating system of claim 3 wherein said nutrient module further comprises:
   a plurality of water-nutrient solution mixture containers and a solenoid valve network arranged so as said solenoid valve network is controlled by said sub-controller to provide a specific water-nutrient solution mixtures having specific water nutrient ratios for growing said different plants and trees.

6. The environment simulating system of claim 3 wherein said air circulation module further comprises:
   a plurality of air inlet fans, electrically coupled to be controlled by said sub-controller; and
   a plurality of air outlet fans electrically coupled to be controlled by said sub-controller.

7. The environment simulating system of claim 6 wherein each of said plurality of inlet fans and each of said plurality of outlet fans are mechanically coupled to a valve controlled by said sub-controller to regulate the amount and speed of air flowing through said growing enclosure.

8. The environment simulating system of claim 6 wherein said water circulation module further comprises a plurality of unidirectional water valves adapted to allow excess water to flow out of said growing enclosure.

9. The environment simulating system of claim 1 wherein said array of sensors further comprises:
   a plurality of pH meters electrically coupled to sense pH levels of said different plants and trees;
   a plurality of total dissolved solids (TDS) sensors electrically coupled to sense ratios of nutrient in nutrient solutions of said different plants and trees
   a plurality of light detection and ranging (LiDAR) sensors electrically coupled to observe said growing conditions of said different plants and trees;
   a plurality of water level sensors electrically coupled to measure a water level within said growing enclosure;
   a plurality of temperature sensors electrically coupled to sense the temperatures within said growing enclosure;
   a plurality of humidity sensors electrically coupled to sense the humidity within said growing enclosure; and
   a plurality of pressure sensors electrically coupled to measure the pressure within said growing enclosure.

10. The environment simulating system of claim 1 wherein said growing enclosure further comprises:
    a top section comprising said micro-controller, said sub-controller, a water tank and at least two nutrient solution tanks;
    a middle section comprising a plurality of growing drawers, arranged vertically, each adapted to have a specific climate recipe for growing a specific plant and vegetable;
    a bottom section comprising a plurality of water-nutrient solution mixture containers and said solenoid valve network arranged so as said solenoid valve network is controlled by said sub-controller to provide a specific water-nutrient solution mixture having a specific water nutrient ratio for growing said different plants and trees in each of said plurality of growing drawers;
    each of said growing drawers further comprises:
    said lighting system, positioned on a ceiling of each of said plurality of growing drawers, capable of providing different type of lights for a photosynthesis process;
    a plant growing tray having an array of circular openings, each of said array of circular openings contains a sponge pod with a hole carved out at a center to store a seed of said specific plant and vegetable;
    a nutrient spraying network, positioned below said water tray in each of said plurality of growing drawers and in communication with said plurality of water-nutrient solution mixture containers and said valve/pump network, capable of spraying said specific water nutrient solution mixture from a bottom of said tray into roots of said specific plant in form of a mist;
    a water tray, positioned below and configured to collect said specific water nutrient solution mixture from said water tray;
    said water circulation system operable to provide water to said water tray and to collect excess said specific water nutrient solution mixture from said water tray back to said proper chamber of said plurality of water-nutrient solution mixture chambers;
    said vacuum module;
    a mist spraying module; and
    said air circulation system capable of circulate air inside each of said plurality of growing drawers.

11. The environment simulating system of claim 10 wherein said top section further comprises an air filter and exhaustion fan electrically connected to said sub-controller circuit.

12. The environment simulating system of claim 1 wherein each of said plurality of drawers further comprises:
    said plurality of air inlet openings positioned on a back of each of said plurality of drawers; and
    a plurality of air outlet openings positioned on side walls of each of said plurality of drawers.

13. The environment simulating system of claim 12 wherein said air circulation network further comprises:
    a plurality of air inlet slits positioned on a top of said top section;
    a plurality of air outlet slits positioned at a bottom front of said bottom section; and
    a plurality of electrical fans, controlled by said sub-controller so that air is entered and circulating vertically from said array of air inlet slits and said plurality of air inlet openings and fanning out inside each of said plurality of drawers and then exit from said plurality of air outlet openings and said plurality of air outlet slits.

14. The environment simulating system of claim 12 wherein said bottom section further comprises a water sprinkler system connected to an outside water source to provide water to said water tank.

15. The environment simulating system of claim 10 wherein each of said growing drawers further comprises a vertical lift door having an upward curved hinge permanently fastened to a middle of said growing enclosure in front of said drawer; and a pneumatic arm connected to said upward curved hinge and to a bottom of said drawer so as when said pneumatic arm extends outward said vertical lift door slides upward close to and almost parallel to the front surface of said smart cabinet, and wherein when said pneumatic arm withdraws said vertical lift door slides back to close said drawer.

* * * * *